(12) United States Patent
Vijayakumar et al.

(10) Patent No.: US 9,237,306 B2
(45) Date of Patent: Jan. 12, 2016

(54) DISTRIBUTED AUDIO/VIDEO BRIDGING FOR CONFERENCING ENDPOINTS

(71) Applicant: ITTIAM SYSTEMS PTE. LTD., Singapore (SG)

(72) Inventors: Goutham Vijayakumar, Erode (IN); Vaibhav Deshu Venkatesh, Bangalore (IN); Kashif Shamaz, Gulbarga (IN)

(73) Assignee: ITTIAM SYSTEMS PTE. LTD., Singapore (SG)

( * ) Notice: Subject to any disclaimer, the term of this patent is extended or adjusted under 35 U.S.C. 154(b) by 0 days.

(21) Appl. No.: 14/321,840

(22) Filed: Jul. 2, 2014

(65) Prior Publication Data

US 2015/0009279 A1  Jan. 8, 2015

(30) Foreign Application Priority Data

Jul. 2, 2013  (IN) .......................... 2926/CHE/2013

(51) Int. Cl.
*H04N 7/14* (2006.01)
*H04N 7/15* (2006.01)
*H04L 29/06* (2006.01)

(52) U.S. Cl.
CPC .............. *H04N 7/152* (2013.01); *H04L 65/403* (2013.01)

(58) Field of Classification Search
CPC . H04L 65/1093; H04L 65/403; H04M 3/567; H04N 7/15
USPC ........................................ 348/14.08; 370/261
See application file for complete search history.

(56) References Cited

U.S. PATENT DOCUMENTS 8,675,847 B2 * 3/2014 Shaffer et al. ................. 379/158
2014/0198175 A1 * 7/2014 Shaffer et al. .............. 348/14.08

* cited by examiner

*Primary Examiner* — Creighton Smith
(74) *Attorney, Agent, or Firm* — Prakash Nama; Global IP Services, PLLC

(57) ABSTRACT

A system and method for distributed audio/video bridging for conferencing endpoints are disclosed. In one embodiment, a plurality of endpoints are connected to a modified video communication terminal (MVCT) via a communication network. The MVCT is an endpoint including an audio/video bridging module (AVBM). Further, one of the plurality of endpoints capable of holding audio video bridging is determined by the AVBM. Furthermore, the connection of one or more remaining endpoints is transferred to the determined endpoint by the AVBM for load balancing. Also, audio and/or video bridging of the endpoints and the MVCT is enabled by the AVBM and the determined endpoint based on connectivity information of the remaining endpoints with the MVCT and the determined endpoint for conferencing participants.

38 Claims, 19 Drawing Sheets

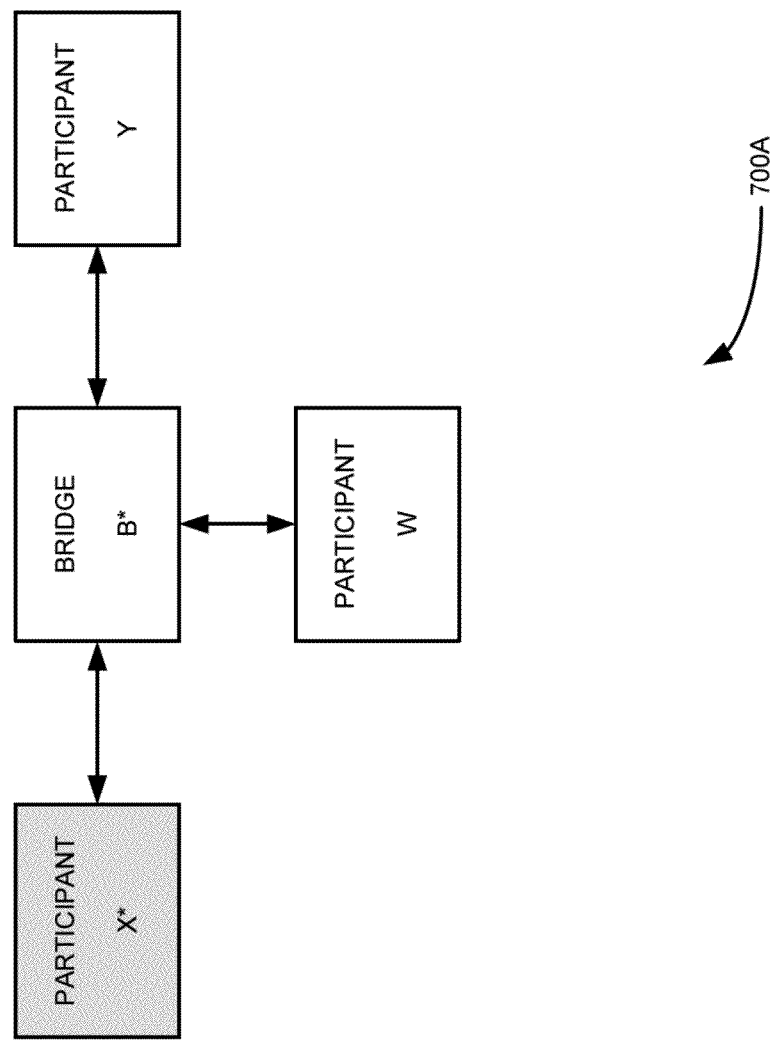

DISTRIBUTED AUDIO/VIDEO BRIDGING FOR CONFERENCING ENDPOINTS

Benefit is claimed under 35 U.S.C 119(a) to Indian Provisional Patent Application Ser. No 2926/CHE/2013 entitled "Distributed bridging in audio-video conferencing systems" by Ham Systems Pte. Ltd. filed on Jul. 2, 2013.

FIELD OF TECHNOLOGY

Embodiments of the present invention relate to audio and/or video conferencing. More particularly, embodiments of the present invention relate to distributed audio/video bridging for conferencing endpoints.

BACKGROUND

Generally, audio and/or video conferencing is a tool for communication and collaboration between multiple (typically 3 or more) participants at different locations. Further, audio and/or video conferencing facilitates audio and/or video communication between geographically distributed teams in global organizations and helps improve productivity and reduce costs for the global organizations.

Existing audio and/or video conferencing system includes a plurality of endpoints and a dedicated bridge (e.g., a multipoint control unit (MCU)) connected to the endpoints. Exemplary endpoints include any terminals capable of video and/or audio communication including desktop video phones, mobile or cell phones, video conferencing units and the like. In the existing audio and/or video conferencing system, participants use the endpoints to call into a common number or an address that is assigned to the dedicated bridge. The dedicated bridge may then enable bridging of audio and/or video streams coming from the endpoints for conferencing the participants. Thus, the conferencing between the participants is dependent on the availability of the dedicated bridge. This may limit the ability to conference with multiple people as and when required. Also, the number of participants in the conferencing may depend on audio/video processing capacity of the dedicated bridge.

In another existing audio and/or videoconferencing system, one of the endpoints participating in the conference can act as a bridge. In this conferencing system, the endpoints that want to communicate among themselves, call into or are called by, the endpoint capable of acting as the bridge. Further, the endpoint acting as the bridge receives audio and/or video streams from the connected endpoints, but may decode the video stream of an active participant and sends back the processed stream to all the participants. Furthermore, the endpoint acting as the bridge mixes audio streams, such that each participant receives audio streams of all participants except its own. However, a number of participants that can be supported by the endpoint acting as the bridge may be limited by audio processing capabilities of the bridge. In other words, the number of participants that can be supported by the endpoint acting as the bridge may be limited by a number of audio decodes the endpoint acting as the bridge can perform.

BRIEF DESCRIPTION OF THE DRAWINGS

Embodiments of the present invention are illustrated by way of an example and not limited to the figures of the accompanying drawings, in which like references indicate similar elements and in which:

FIGS. 7A-7G illustrate block diagrams of example distributed audio/video bridging enabled conferencing systems, according to one embodiment.

Other features of the present embodiments will be apparent from the accompanying drawings and from the detailed description that follows.

DETAILED DESCRIPTION

In the following detailed description of the embodiments of the invention, reference is made to the accompanying drawings that form a part hereof, and in which are shown, by way of illustration, specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Embodiments described herein provide methods, techniques, and systems for distributed audio/video bridging for conferencing endpoints. For establishing audio and/or video conferencing, a plurality of endpoints connects to a modified video communication terminal (MVCT) via a communication network. The MVCT including an audio/video bridging module (AVBM) can be an endpoint or a central server. For example, the MVCT can act as a participant and a bridge when MVCT is the endpoint. The MVCT can only act as a bridge when MVCT is the central server. The term "endpoint" refers to video communication terminals (VCTs), voice over Internet protocol (IP) communication terminals (VoCTs), and the like. Exemplary VCTs include terminals capable of video communication over IP including desktop video phones, mobile or cell phones, tablets, stand-alone or in-built video conferencing units and the like. The VoCTs may include stand-alone or in-built terminals capable of audio communication over IP.

The AVBM then determines endpoints capable of holding audio and/or video bridging. Further, the AVBM chooses one of the determined endpoints depending on current load of the determined endpoints. Furthermore, the AVBM transfers connection of one or more remaining endpoints, connected to the MVCT, to the chosen endpoint for load balancing. If the MVCT is the endpoint, the AVBM and the chosen endpoint then enable audio and/or video bridging of the endpoints and the MVCT based on connectivity information of the remaining endpoints with the MVCT and the chosen endpoint for conferencing participants. If the MVCT is the central server, the AVBM and the chosen endpoint then enable audio and/or video bridging of the endpoints based on connectivity information of the remaining endpoints with the MVCT and the chosen endpoint for conferencing participants.

Figure 1A:
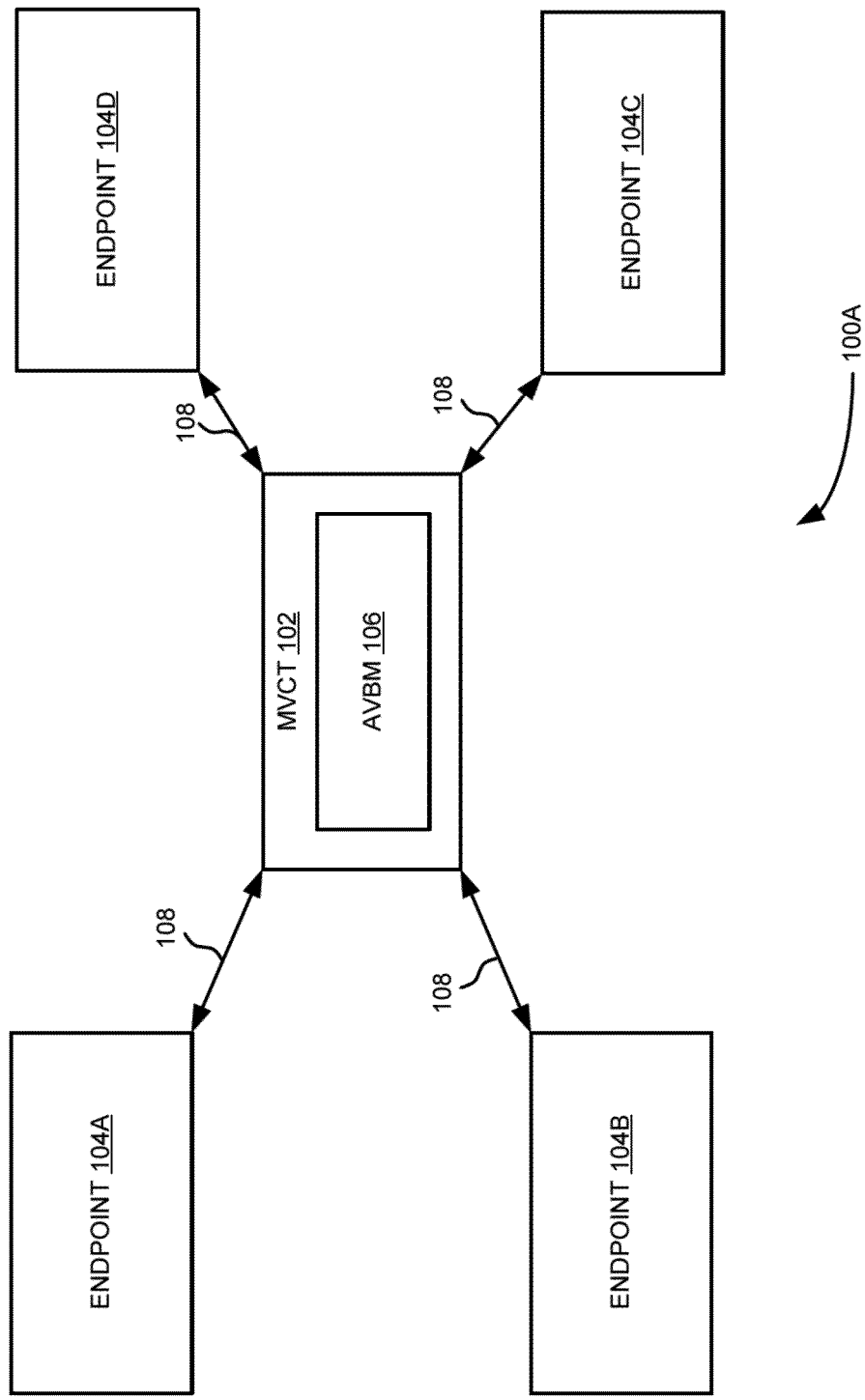
FIGS. 1A-1D illustrate block diagrams of a distributed audio/video bridging enabled conferencing system, according to one embodiment.

FIGS. 1A-1D illustrate block diagrams 100A-D of a distributed audio/video bridging enabled conferencing system, according to one embodiment. As shown in FIG. 1A, the block diagram 100A includes endpoints 104A-D and a MVCT 102. For example, the MVCT 102 can be an end point which acts as one of participants in the conference and a bridge. Further, the endpoints 104A-D are connected to the MVCT 102 via a communication network 108, such as an IP network and so on. Furthermore, the MVCT 102 includes an AVBM 106 to enable audio and/or video bridging of audio and/or video streams associated with the end points 104A-D and the MVCT 102. In other words, the AVBM 106 enables the audio and/or video bridging of the audio and/or video streams associated with the MVCT 102 and incoming audio and/or video streams associated with the end points 104A-D for conferencing participants. The AVBM 106 includes distributed audio/video bridging capabilities.

Further, the AVBM 106 determines endpoints (e.g., endpoints 104A and 104D) which are capable of holding audio and/or video bridging. In one example implementation, the AVBM 106 determines current load of the MVCT 102 upon connecting the endpoints 104A-D. The AVBM 106 then determines endpoints 104A and 104D which are capable of holding the audio and/or video bridging when the current load of the MVCT 102 exceeds a threshold value. For example, the AVBM 106 determines the endpoints 104A and 104D based on hardware, software and networking capabilities of the endpoints 104A and 104D. For example, the hardware capabilities may include processing power, accelerators, memory, current load and the like. The software capabilities may include protocols, codecs, bit rate, resolutions supported, security, and other features that enhance video communication. The network capabilities may include bandwidth, current network load and the like. In one example implementation, the endpoints 104A and 104D may include distributed audio/video bridging capabilities (similar to the AVBM 106) or may include only audio/video bridging capabilities without distributed bridging capability.

Figure 1B:
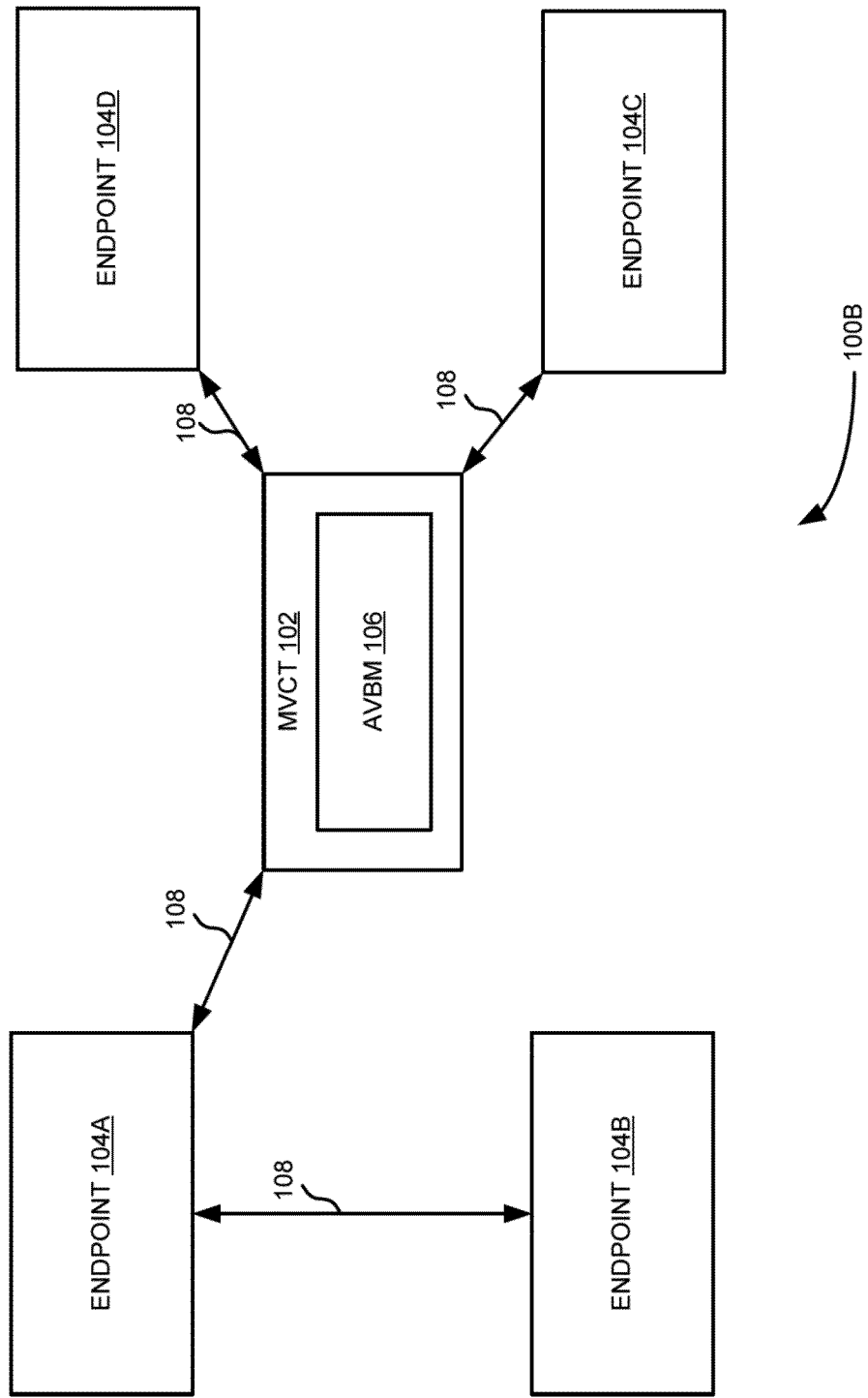

Furthermore, the AVBM 106 chooses one of the end points 104A and 104D (e.g., endpoint 104A) depending on current load of the end points 104A and 104D. In addition, the AVBM 106 transfers the connection of the endpoint 104B to the endpoint 104A for load balancing (as shown in FIG. 1B). There are now two bridges, namely the MVCT 102 and endpoint 104A, in the conference. The AVBM 106 then enables the audio and/or video bridging of the audio and/or video streams associated with the endpoints 104A, 104C and 104D and the MVCT 102. The endpoint 104A then enables audio and/or video bridging of the audio and/or video streams associated with the endpoints 104A and 104B and MVCT 102. In one example, bridging and delivery of appropriate content is managed by the AVBM 106. Each bridge 102 and 104A composes the audio streams in such a way that each participant connected to it receives the mixed audio of every participant except his own. The video streamed by the bridges might be chosen based on active speaker detection (ASD) or gesture based detection (GBD) or be a video matrix composed of participant streams. In some embodiments, the ASD could have been used to detect a dominant speaker based on voice detection. In some embodiments, the GBD could have been used to detect a dominant speaker based on gesture. In case of the ASD and GBD based endpoints, the term dominant speaker refers to the participant in focus, i.e., the participant whose content (i.e., audio and/or video) is streamed across to the endpoints.

Figure 1C:
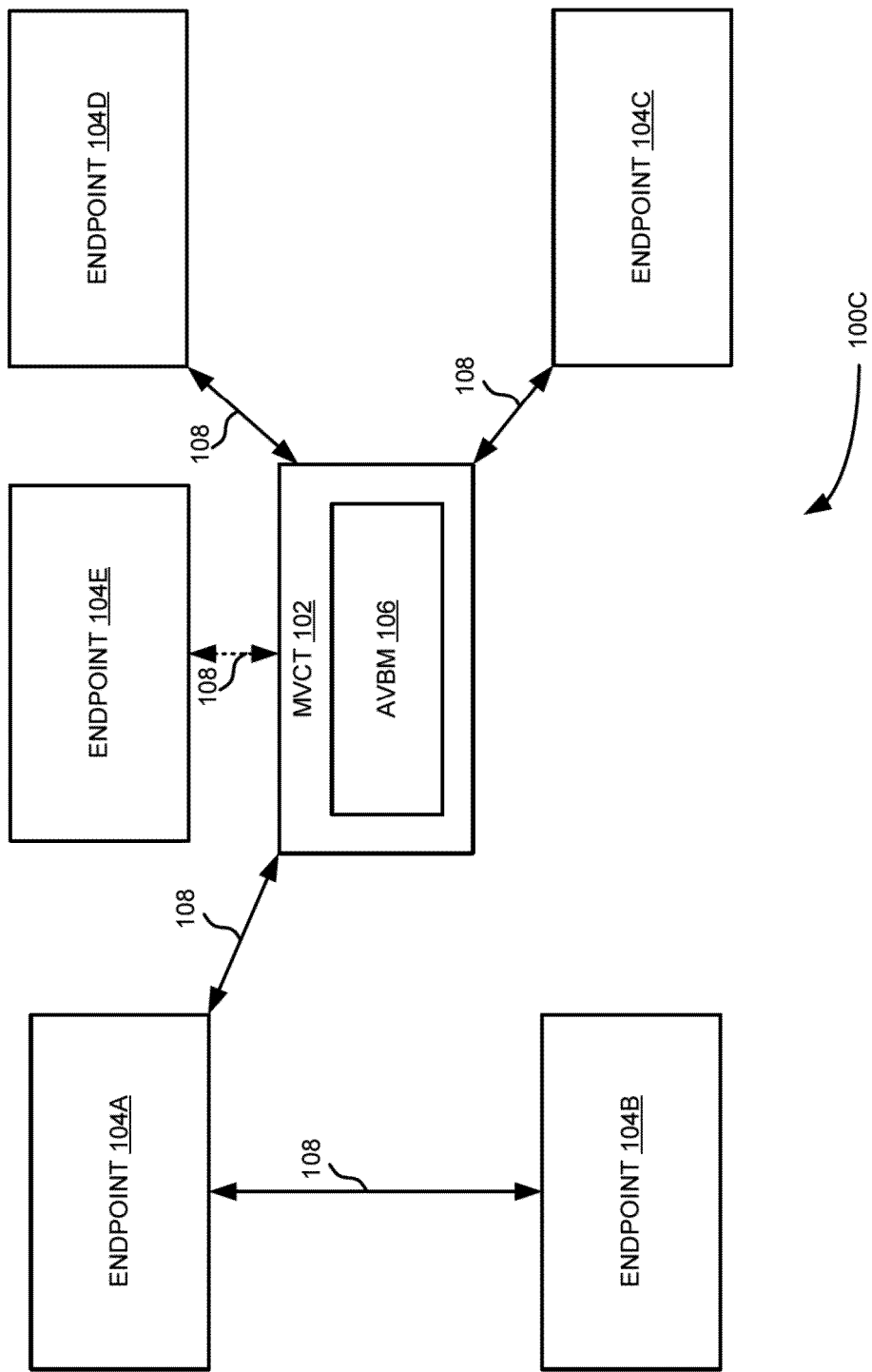
Figure 1D:
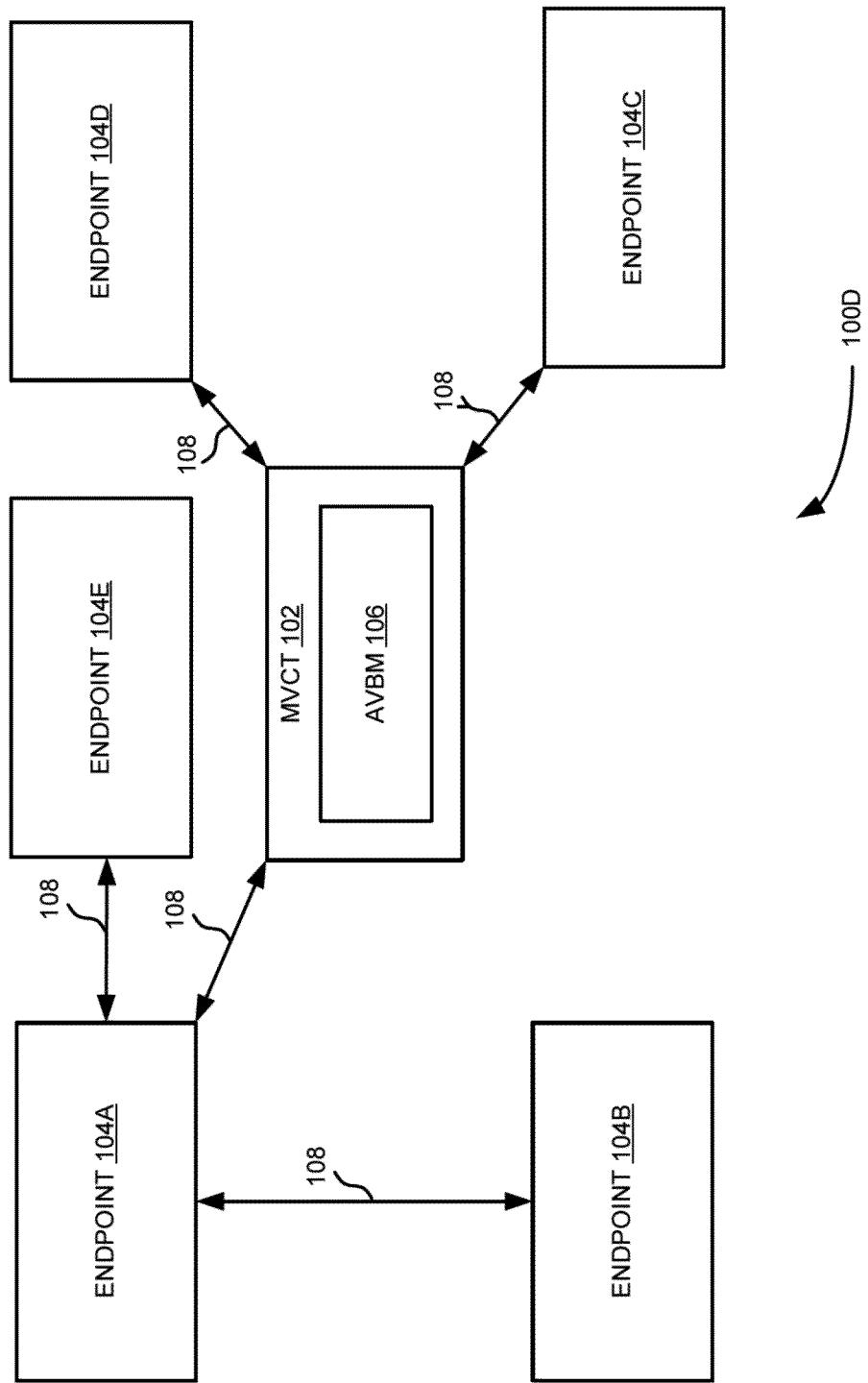

Referring now to FIG. 1C, the block diagram 1000 illustrates an endpoint 104E attempting to join the conference. In this scenario, the AVBM 106 determines that load capacity of the MVCT 102 exceeds the threshold value with the addition of the endpoint 104E. Further, the AVBM 106 takes action to utilize processing capacities of the endpoint 104A or endpoint 104D capable of holding audio and/or video bridging. In the example illustrated in FIG. 1C, the AVBM 106 takes action to utilize the capacities of the endpoint 104A based on requirements of the endpoint 104E. The AVBM 106 utilizes a processing power of the endpoint 104A or shifts the endpoint 104E so that it connects directly to the endpoint 104A and no session gets established between the endpoint 104E and MVCT 102. In one embodiment, when an invite arrives at the endpoint 104A, the endpoint 104A could manually accept the invite from the endpoint 104E, the endpoint 104A could be programmed to accept all invites, the endpoint 104A could be intimated by the MVCT 102 to respond favorably to the invite or the endpoint 104A could be manually asked to respond favorably to the invite. With this the endpoint 104E joins the conference (as shown in FIG. 1D).

In some scenarios, the endpoint 104E is notified about existing participants in the conference. The endpoint 104E might choose to continue or discontinue with the call, based on the participants already present on the conference. In one embodiment, when a call reaches a server, it identifies that the call is to be routed to the conference. When this happens, it intimates the user about the current status of the endpoint 104A and the participants connected with it. The endpoint 104E may choose to continue or discontinue the call based on this information. In another embodiment, when a call reaches the endpoint 104A, the endpoint 104A intimates the endpoint 104E about the current status of the endpoint 104A and the participants connected on him. The endpoint 104E may choose to continue or discontinue the call based on this information. The process of distributed audio and/or video bridging is explained in more detail with reference to FIGS. 2-7G.

Even though FIGS. 1A-1D are explained with reference to the MVCT 102 as the endpoint, one can envision that the same technique can be used for enabling distributed audio and/or video bridging of the endpoints when the MVCT 102 is a central server. The only difference in this scenario is that the MVCT 102 acts only as a bridge and not as a participant in the conference that means it does not produce any audio and/or video streams locally.

Figure 2:
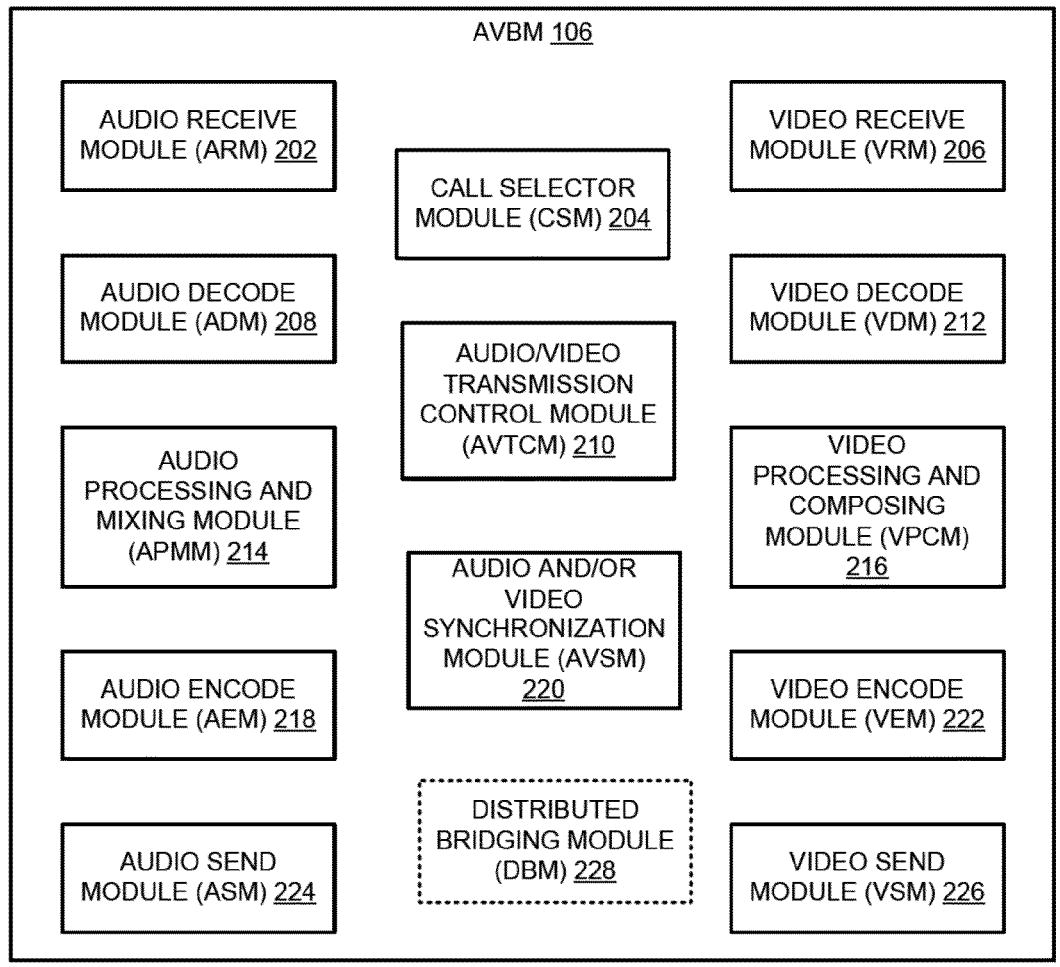
FIG. 2 is a block diagram illustrating some components of an audio/video bridging module, such as the one shown in FIGS. 1A-1D, according to one embodiment.

Referring now to FIG. 2, which is a block diagram 200 illustrating some components of the AVBM 106, such as the one shown in FIGS. 1A-1D, according to one embodiment. As shown in FIG. 2, the AVBM 106 includes an audio receive module (ARM) 202, an audio decode module (ADM) 208, an audio processing and mixing module (APMM) 214, an audio encode module (AEM) 218 and an audio send module (ASM) 224 to receive, render, decode, process and send the audio streams. Furthermore, the AVBM 106 includes a video receive module (VRM) 206, a video decode module (VDM) 212, a video processing and composing module (VPCM) 216, a video encode module (VEM) 222, and a video send module (VSM) 226 to receive, render, process, compose, decode, encode and send the video streams.

In addition, the AVBM 106 includes an audio and/or video synchronization module (AVSM) 220 for synchronizing each of decoded audio and/or video streams of each participant connected to the bridge before local play out. Also, the AVBM 106 includes an audio/video transmission control module (AVTCM) 210 to control parameters of the audio/video streams, such as the resolution, bit rate, frame rate, and the like from each participant connected to the bridge. This enables bridging of more than otherwise possible participants by reducing the processing power needed by the AVBM 106 to bridge the participants or by reducing the effective bit rate required at the bridge. Moreover, the AVBM 106 includes a distributed bridging module 228 for managing bridging and delivery of appropriate content. Further, the AVBM 106 includes a call select module (CSM) 204 to enable a virtual n-way audio/video bridging in the bridge.

In one exemplary embodiment, the ARM 202 enables the bridge to receive multiple audio streams in different formats from endpoints connected to it and de-jitter each audio stream independently. Further, the ADM 208 decodes fully or partially each de-jittered audio stream. Furthermore, the VRM 206 enables the bridge to receive multiple video streams in different formats and resolutions, from the endpoints connected to it and de-jitter each video stream independently, if required. In addition, the VDM 212 enables decoding fully or partially each de-jittered video stream.

Moreover, the AVSM 220 synchronizes each of the decoded audio and/or video streams of each connected participant before local play out. The AVSM 220 further synchronizes the audio and/or video streams before encoding and streaming out to the participants. In one example, the AVSM 224 works across all the other sub-components of the AVBM 106 to track and re-timestamp the audio and/or video streams as required, in order to achieve audio and/or video synchronization of the transmitted audio and/or video streams.

Also, the CSM 204 enables automatic and/or manual selection of a participant or a list of participants based on preselected criteria to enable virtual n-way audio/video bridging capability in the bridge. This automatic and/or manual selection of the participant or the list of participants facilitates in reducing the processor intensive audio/video processing during audio/video bridging without limiting the number of participants calling into the bridge. In some embodiments, the automatic selection of the participant or the list of participants by the CSM 204 takes control inputs from the bridge based on selection parameters and selection criteria. Further, the CSM 204 monitors all the participating endpoints at the bridge and based on the selection parameters and the selection criteria, the CSM 204 selects one or more active participants. Exemplary selection parameters or the selection criteria include specific participants to be decoded and displayed, the number of participants who are active (i.e., for example, the participant at the endpoint is speaking), participants who were active just before the currently active participant and so on. The CSM 410 can also select a participant as an active participant, if that participant has remained active for a predefined duration of time. Further, the audio/video streams from the selected active participants are decoded and displayed to the other endpoints at the bridge. In this scenario, the endpoints can identify that they are on a conference where n-way active speaker based bridge is present and may use voice activity detection (VAD) to not send their own video packets, thereby reducing network load.

In some embodiments, the manual selection of the participant or the list of participants by the CSM 204 includes selection through signaling via standard protocols, such as dual tone multiple frequency (DTMF) from the participants who want to be selected as an active participant or through manual selection at the bridge. Further, the number of active participants that can be chosen using the manual selection is significantly higher than the number of active participants that can be chosen using the automatic selection. In an extreme use case scenario, only the audio/video stream from one of the participating endpoints can be selected at a time. Therefore, the number of participating endpoints is independent of the processing capability of the bridge.

In some embodiments, the CSM 204 may enable the bridge to choose which participant the bridge wants to display on its own screen. The bridge may send this participant's video stream or the dominant speaker's video stream to all participants connected on it. The default stream sent is that of the dominant speaker.

Furthermore, the APMM 214 post processes the audio stream coming from each of the participants before playback and/or re-encoding. Exemplary post-processing includes mixing the incoming audio streams based on a weighted averaging for adjusting the loudness of the audio stream coming from each of the participants. Furthermore, the APMM 214 composes the audio streams in such a way that each participant connected to it receives the mixed audio of every participant except his own.

In addition, the VPCM 216 processes and composes the RAW video streams received from the VDM 212. For example, processing the decoded video streams includes resizing the video streams. In one example, the VPCM 230 composes the RAW video streams based on active speaker detection (ASD) or gesture based detection (GBD) or be a video matrix composed of participant streams. In one embodiment, the VPCM 216 performs a differential frame rate composition of different windows within a larger 'tiled' window. For example, the VPCM 216 combines one video at 15 fps (repeating every alternate frame) while the other video is at 30 fps. Effectively, the composed signal is at 30 fps, but the region that is composed at 15 fps is encoded using lesser number of bits as every alternate frame is identical to the previous frame, thus reducing the overall bit rate without needing any explicit selective coding in the encoder OR needing any selective coding of regions as separate streams. The participants may have the flexibility to display different audio and/or video streams coming to them in a position and size as defined by the user OR an external program. Particularly, the participants further have flexibility to be able to extract the region from the audio and/or video stream which has the region information to display the region in the position and size as configured by the user or an external program.

Moreover, the AEM 218 encodes each of the audio streams coming from the APMM 214 separately, in a format required by each of the associated endpoints. Also, the ASM 224 receives each of the audio streams from the AEM 218 and sends the encoded audio streams to each of the associated endpoints.

Further, the VEM 222 encodes each of the composed video streams coming from the VPCM 216 in a format and resolution supported by each of the associated endpoints. In addition, the VSM 226 receives the encoded video stream from the VEM 222 and sends them to the associated endpoints via the communication network. The VSM 226 further sends the encoded video stream to one or more of remote servers, via the communication network, for broadcasting, real-time view by authorized people, storing for archival non real-time playout by the authorized people, re-distributing to the end points in a network and the like.

In an exemplary embodiment, the processing modules, such as the AEM 218, VEM 222, ADM 208, VDM 212 and the like can be accelerated at an endpoint/endpoint on which the collaboration functionality is implemented, using a co-processing unit. For example, the acceleration is done by sending the RAW signals over a peripheral interface, such as a universal serial bus (USB) interface which then gets processed and is returned back in a compressed format, as required over the same or another peripheral interface. In one example, the signal sent over to the co-processing is compressed in a format, such as joint photographic experts group (JPEG) and the like that is of low complexity and is implemented on the end point and the co-processing unit further de-compresses and re-compresses in a more complex format, such as H.264 or high efficiency video coding (HEVC).

Furthermore, the AVTCM 210 can control parameters such as, resolution, bit rate and frame rate of the audio/video streams coming from each of the connected endpoints. In addition, the AVTCM 370 can request an endpoint to reduce the bit rate and/or resolution of transmission of the audio/video streams to reduce the bandwidth requirement and the processing power required at the bridge and thereby increases the number of participating endpoints at the bridge without compromising on the bridging experience. An exemplary case of requesting, receiving and decoding 4 low resolution images of quarter video graphics array (QVGA) streams to compose one higher resolution video graphics array (VGA) stream at the bridge for display as well as re-encoding, as against decoding 4 VGA streams, resizing each to QVGA before composing the images to a VGA resolution to display/re-encoding to achieve the same effect, but with significant reduction of processing requirement at the bridge.

Also, the DBM 228 exchanges information about and with participants in the conference. The information exchanged is vital for the functioning of the conference. The DBM 228 need to understand the capabilities of the endpoints in the conference to perform any action. Further, the DBM 228 achieves optimal configuration of the conference by utilizing the shared resources of processing power and capability effectively across the conference. Furthermore, the DBM 228 determines endpoints capable of holding audio and/or video bridging to support a participant and dynamically shift participants across suitable endpoints in the conference to achieve best possible user experience. In addition, the DBM 228 provides co-existence across participants and the DBM 228 in the conference. For example, the DBM 228 provides support and co-exists with a participant's endpoint when it starts performing bridging. It is necessary to understand that the conference may have one or more DBMs depending on the endpoints connected. In one embodiment, there is a master-slave model in which one of the DBMs (usually the first) takes up the role of a master DBM. Based on information from each of the DBMs, it makes decisions for the whole conference and the other DBMs comply. In another embodiment, the DBMs act as peers and synchronize information. Each DBM makes decisions for the immediate set of participants connected on it. This requires a greater amount of information synchronization as there is a bigger chance of failure due to simultaneous decision making. The functionalities of the DBM 228 are explained in more detail with reference to FIG. 3.

Figure 3:
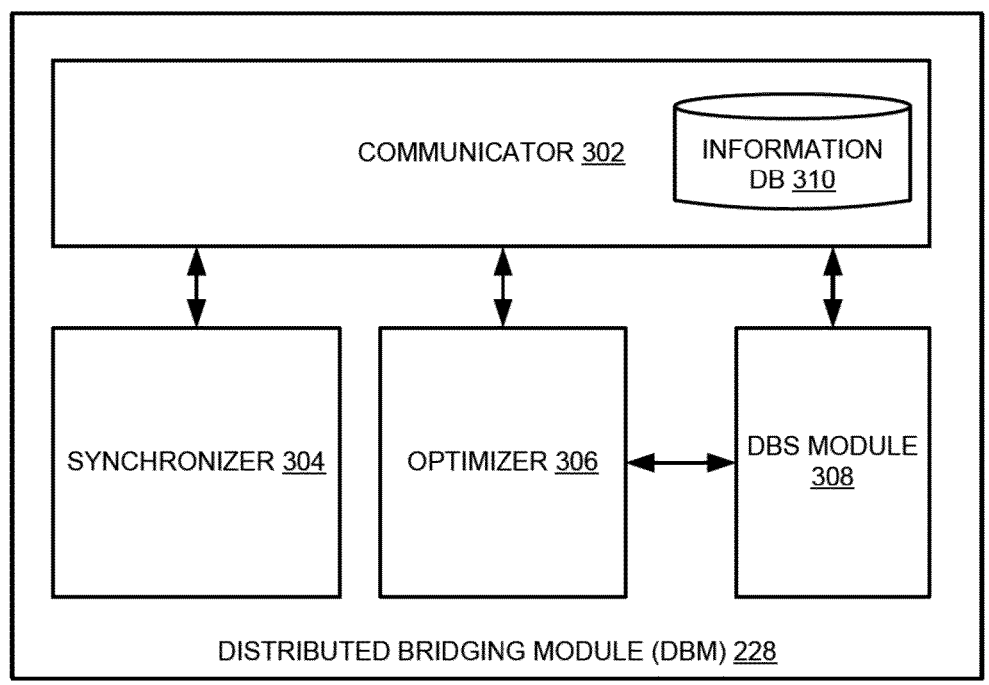
FIG. 3 is a block diagram illustrating some components of a distributed bridging module, such as the one shown in FIG. 2, according to one embodiment.

Referring now to FIG. 3 is a block diagram illustrating some components of the DBM 228, such as the one shown in FIG. 2, according to one embodiment. As shown in FIG. 3, the DBM 228 includes a communicator 302, a synchronizer 304, an optimizer 306, a distributed bridge shifting (DBS) module 308 and an information database (DB) 310. Further as shown in FIG. 3, the communicator 302 is communicatively coupled to the synchronizer 304, optimizer 306 and DBS module 308.

Furthermore, the optimizer 306 and the DBS module 308 are communicatively coupled to each other.

In one embodiment, the conference is made possible through co-existence between multiple endpoints. In order to identify and utilize bridging capabilities of the endpoints, the DBM 228 requires information about each participant connected on the conference at different points of time, be it the start of the conference or during the ongoing conference. The communicator 302 is responsible for both obtaining and sharing necessary information with the endpoints on the conference.

An example set of information required from each endpoint in the conference includes the following:
1. Bridging capability of an endpoint: The ability of the endpoint to act as a bridge is identified.
   a) If the endpoint is capable of bridging, a maximum number of participants it can support as a bridge and a number of participants currently connected to it are identified. Once identified as a bridging capable, the endpoint is constantly probed to identify the number of participants connected to it.
   b) If the endpoint is not capable of bridging, the information is utilized to make appropriate decisions for the conference.
2. Capabilities of the endpoints: Different parameters that the DBM 228 can use in deciding about the bridging capability of a participant include hardware, software and networking capabilities.
3. Willingness of the participant to be a bridge: The participant may have bridging capabilities, but may not be willing to do so. This information should also be used, to decide whether the participant is a bridge-capable participant (BCP).

An example set of information exchanged between DBMs includes:
1. Load Factor information: Information exchange on load factor and the parameters governing it. This is required to determine the best way to optimize the conference.
2. Choice of a suitable BCP for a scenario: When a DBM determines a suitable BCP for a scenario it intimates the other DBMs about this. Depending on the use case, either all or some of the DBMs may receive this information.
3. Miscellaneous request-response messages for synchronization of a state.
4. Information used to manage bridge shifting use cases.

In some embodiments, the communicator 302 may request/identify the above mentioned information from/about a participant as and when it is required through the information exchange mechanisms. In one example, exchange of information between the participants and a DBM or in-between DBMs can be made possible in different ways, both standard and proprietary.

A generic means of exchanging information through proprietary methods is presented below:
1) Exchange of Information messages through a request-response technique:
In one embodiment, the DBM 228 employs customized request-response techniques to obtain required information about a participant. These include queries across the DBM 228 and the participant. They could be any of the following:
a) Existing information exchange protocols for request-response messages, such as XML based communication, REST based communication etc. b) The operating system or software framework on the endpoint may provide mechanisms for communication. For example, in the android framework, intents across endpoints can be used to exchange the required information. c) A signaling protocol used for the call establishment can be extended to achieve information exchange. For example, if a call is established using session initiation protocol (SIP) signaling, SIP information (INFO) messages can be used for this purpose. d) A control protocol can also be used for information exchange. For example, if the control protocol used for the call is a RTP control protocol (RTCP), then RTCP APP messages (Application-defined packet) can be used for this purpose. e) A proprietary data exchange protocol.

2) Exchange of Information messages through external server(s):

In one embodiment, an external server can be used to maintain the information about the bridging capabilities of each participant. The server could be a signaling server used for the call or be a dedicated server. The server may use any of the standard or proprietary methods to obtain information about the participants. When the DBM 228 requires information, it queries the server for it.

3) Exchange of Information messages through manual Intervention:

In one embodiment, manual intervention can be used to identify if a participant is capable of being a bridge. This could be done through exchange of information directly over the call or by use of interactive queries in an application.

In some embodiments, the DBM 228 probes the participants connected to it to obtain the following information, through standard means:

1) The maximum number of participants the endpoint under consideration can support:

In one embodiment, the DBM 228 registers itself with multiple service providers or with multiple usernames/accounts on the same service. When in-call using one of the usernames, it uses the other username(s) to poll bridging capabilities of connected endpoints. For example, let A be an endpoint with the DBM 228 in it. The DBM 228 registers with multiple usernames, one of which is intentionally a dummy username, which it uses to identify BCPs. Let a call be established between endpoint B and A (A on its main username). To identify if B is bridge-capable, A attempts a dummy call with B using its other username. If B acknowledges this request, the DBM 228 identifies that B can support one more user. When it receives an acknowledgement, A sends a cancel request to B, so a media session is never established with the dummy username of A. A can repeat this probing method whenever required to find if a participant is bridge-capable. The application will reject a call automatically if it has reached its limit of supported participants. Using this it is identified that it can't support an extra participant. If the application can support a new user, it might give a ring before it is accepted. The participant may or may not acknowledge this. In this scenario, a preferred mode of operation for a participant is Auto-answer.

2) The number of participants connected to the endpoint currently:

The information shared by application layer protocols about sources contributing to a stream can be used to determine a status of an endpoint. For example, if the application protocol used for the conference call is RTP, then SSRC (synchronization source) and CSRC (contributing source) fields in a RTP video stream will be used to monitor if an endpoint had indeed become a bridge. In a RTP session, each stream has a unique ID which is its SSRC. This SSRC can be used to identify the originator of the stream. The CSRC field can be used to determine the number of video participants connected to this bridge. In case of a bridge, the CSRC field of the bridge's RTP stream contains information of all the contributing participants (i.e., the SSRCs of all the participants who have been mixed). For example, if A is bridging two end points named B and C, then the CSRC field of the RTP stream of A will contain the SSRCs of B and C. Similarly in the conference, the DBM 228 can recognize other bridges in the same way. Let's take a conference where there are two bridges A and B. A is connected to end points C and B is connected to another end point E. Here since B is a bridge, the CSRC of its RTP will stream will contain A as a contributor as well. When A receives this stream it can see itself in the CSRC and hence identify B as another bridge.

The communicator 302 also manages the information that it obtains and information about itself by saving it as part of the information database (DB) 310 that is a part of it. It uses this to save history, preferences and state information that it attains about different endpoints.

Further, the conference is aimed at leveraging computing power of different endpoints in the conference to share load. Though there are different ways to assess load, the bridging performed by an endpoint presents a direct assessment, of load on an endpoint in terms of both system and network load. The optimizer 306 ensures that the bridging load is shared across endpoints that are bridge capable. An optimal load ensures quality and reduces risk of failure in the conference. Achieving an optimal configuration involves two steps:

1. Identify BCPs with the required capability:

When a new participant needs to be added or when an existing participant needs to be shifted dynamically, the BCPs who have the necessary capability requirements for the scenario are identified. Based on the information gathered by the communicator 302, the suitable BCPs in the conference are identified.

2. Connect participants such that the load factor is optimized:

After finding a set of suitable BCPs, connect the new or existing participant to a suitable BCP in such a way that the load factor remains at an optimal level across the conference. The DBM 228 chooses the best one among the set of BCPs depending on the type of DBM co-existence, information about any change is shared with a master DBM or with all of the DBMs in the conference. In one embodiment, the optimizer 306 identifies the load factor of BCPs and attempts to minimize it across the conference. In the conference, the load Factor is a function of a set of parameters that affect the load on the BCP. The example parameters that are taken into account while determining the load factor of a BCP are:

1. A maximum number of participants that the BCP can support (X).
2. A number of participants currently supported by the BCP (Y).
3. Capabilities of the BCP (Z) —Based on hardware, software, network capabilities.

So, the Load factor (LF) on a BCP, can be defined as:

$$LF_i(\text{Load factor of } i^{th} \text{ BCP}) = f(X, Y, Z),$$

where X, Y and Z are the parameters mentioned above.

In one embodiment, the DBM 228 could employ static algorithms like a round-robin method. It could be a basic algorithm for a homogenous system, composing of similar BCPs or a weighted algorithm in case of a heterogeneous system. In another embodiment, the DBM 228 could employ dynamic algorithms, where the BCP identifies whenever the load crosses its threshold and initiates a participant transfer either. In yet another embodiment, the DBM 228 could employ dynamic algorithms, where the BCP identifies whenever the load falls below a threshold and requests a participant transfer. The transfer of connection of the participant is explained in more detail with reference to FIG. 5. In one example implementation, the DBM 228 maintains a threshold load factor for each BCP to decide whether the BCP is under-loaded or over-loaded. At any point in time in the conference, the DBM 228 maintains a BCP Load factor map including under-loaded BCPs which are a set of BCPs for which a current load factor is less than their individual thresholds, over-loaded BCPs which are set of BCPs for which a current load factor is more than their individual thresholds and threshold-load BCPs which are a set of BCPs on which a current load factor has reached their threshold. The DBM 228 keeps refining these lists by getting the latest information from the BCPs. The optimizer 306 constantly tries to bring the load factor to a threshold level across the endpoints in the conference. The load sharing is continuously optimized such that the number of under-loaded and over-loaded BCPs is a minimum. The process of load optimization is explained in more detail with reference to FIGS. 6A-6C.

Additional factors which the DBM 228 can utilize in choosing the BCP includes:
1. Intelligent distribution of participants across BCPs—Participants can be distributed effectively across the conference based on network delay or geographical location. This ensures that the segment of the participants on each BCP faces minimum delay.
2. Hysterics—Based on previous performance data of a BCP, the BCP is chosen for some functionalities.
3. If the capacity of the BCPs and bridges in the conference are exhausted, distribute load to an external service. For example, a dedicated endpoint or server or a cloud-based service can be used in the conference to assist with the conference.

Furthermore, the DBS module 308 is employed to move one/more participants across the endpoints in the conference. In other words, the DBS module 308 shifts the participants in the conference across bridge-capable endpoints in the conference. This could be done either at the start of a conference, while adding a new participant to the DBC or at run-time. The DBS module 308 a) optimize load across the conference by moving participants across the conference to endpoints with lesser load, the overall load on the conference is kept at an optimal level always, b) moves participants across endpoints so that they are bridged through more suitable endpoints (factors like compatibility, geographical location etc. could guide in this decision), and c) handover when a current bridge decides to leave the conference. If the bridging endpoint wants to leave the conference due to some reason like low power, network or system overload, and so on or when it is going through a sudden failure, it can dynamically shift participants to another bridge and leave the conference. By this, the other participants on the conference remain unaffected and the conference continues.

In addition, the synchronizer 304 creates and maintains the conference across different types of endpoints. The conference happens across different types of endpoints:
1. DBM based endpoints:
These are endpoints including distributed audio and/or video bridging capabilities. Their video layout could be a) a matrix layout based with information about position and size of respective participant videos, b) ASD based or c) GBD based.
2. Non DBM-based endpoints:
These endpoints represent standard endpoints including only audio and/or video bridging capabilities without the distributed audio and/or video bridging capability. Their video layout could be a) a matrix layout based with no extra information is shared, b) ASD based or c) GBD based.

In the conference, there can be different configurations possible. Typically, there are endpoints that understand and co-exist with the DBM 228 and there are endpoints that are non-DBM ones. This is where the role of the synchronizer 304 is needed.
1. The synchronizer 304 plays the role of interfacing and responding appropriately when endpoints that are not in sync work together. For example, when a DBM and non DBM endpoint start bridging together, video layouts could be ruined if the endpoints do not understand that there is another bridge in the conference. Each bridge would also attempt to perform operations that are not needed in bridge co-existence. It is the synchronizer's 304 role to constantly monitor the bridges connected to it. The synchronizer 304 ensures that the endpoint does not send a composed video stream to another bridging endpoint if it detects the dominant speaker to be present on it. This avoids the problem of redundant video streams exchanged between bridges and recursive video content layout when bridges 'blindly' stream to each other.
2. The synchronizer 304 also helps in maintaining information sync across DBMs in the conference so that decisions can be made based on the latest information. The synchronizer 304 also makes sure that all the information necessary for a conference from participants and/or bridges are obtained periodically and are available for decision making. The synchronizer 304 uses the communicator 302 to obtain this information. For example, DBMs need to communicate with each other to share the load factor, capabilities and so on. As another example, the first step to identifying if an end-point is already bridging, is to monitor it constantly for change in number of participants supported by it.

Figure 4A:
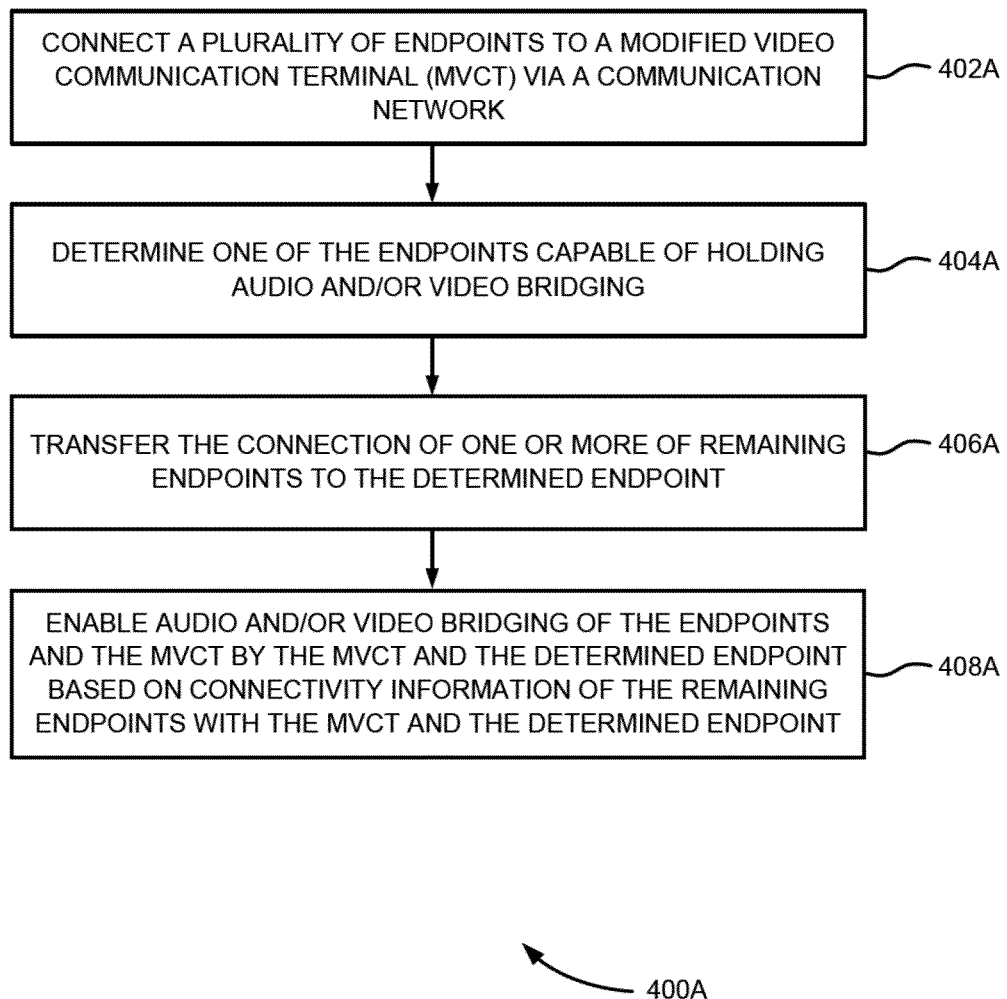
FIG. 4A illustrates a flow diagram of an example method for distributed audio/video bridging for conferencing endpoints, according to one embodiment.

FIG. 4A illustrates a flow diagram 400A of an example method for distributed audio/video bridging for conferencing endpoints, according to one embodiment. At block 402A, a plurality of endpoints are connected to a MVCT via a communication network. The MVCT including an AVBM is an endpoint that is acting as a participant and a bridge. In other words, the MVCT can acts as a participant and also as a bridge in the conference. At block 404A, one of the endpoints capable of holding audio and/or video bridging is determined by the AVBM. In an example implementation, current load of the MVCT is determined by the AVBM upon connecting the endpoints to the MVCT. Further in the example implementation, the one of the endpoints capable of holding the audio and/or video bridging is determined by the AVBM when the current load of the MVCT exceeds a threshold value. In one example, one of the endpoints capable of holding the audio and/or video bridging is determined based on hardware, software and networking capabilities of the one of the endpoints. For example, the hardware capabilities may include processing power, accelerators, memory, current load and the like. The software capabilities may include protocols, codecs, bit rate, resolutions supported, security, and other features that enhance video communication. The network capabilities may include bandwidth, current network load and the like.

At block 406A, the connection of one or more remaining endpoints is transferred to the determined endpoint by the AVBM for load balancing. At block 408A, audio and/or video bridging of the endpoints and the MVCT is enabled by the AVBM and the determined endpoint based on connectivity information of the remaining endpoints with the MVCT and the determined endpoint for conferencing participants. In an example implementation, the MVCT and the determined endpoint are synchronized by the AVBM. Upon synchronizing the MVCT and the determined endpoint, the audio and/or video bridging of the endpoints and the MVCT is enabled by the AVBM and the determined endpoint based on connectivity information of the remaining endpoints with the MVCT and the determined endpoint. In one embodiment, the audio and/or video bridging of audio and/or video streams of the MVCT and the endpoints connected to the MVCT is enabled by the AVBM. Further, the audio and/or video bridging of audio and/or video streams of the determined endpoint and the endpoints connected to the determined endpoint is enabled by the determined endpoint. In some embodiments, one of the participants or a list of participants are automatically selected. Further, video streams associated with the one of the participants or the list of participants are displayed on the plurality of endpoints and the MVCT. The one of the participants or the list of participants selected automatically may be active participants in the conference.

In some embodiments, current load of the MVCT is determined by the AVBM when a new endpoint is connecting to the MVCT. The new endpoint is then transferred to any endpoint capable of holding audio and/or video bridging by the AVBM when the current load of the MVCT exceeds the threshold value. The process of distributed audio/video bridging for conferencing endpoints is described in more detail with reference to FIGS. 1A-3 and 5-7G.

Figure 4B:
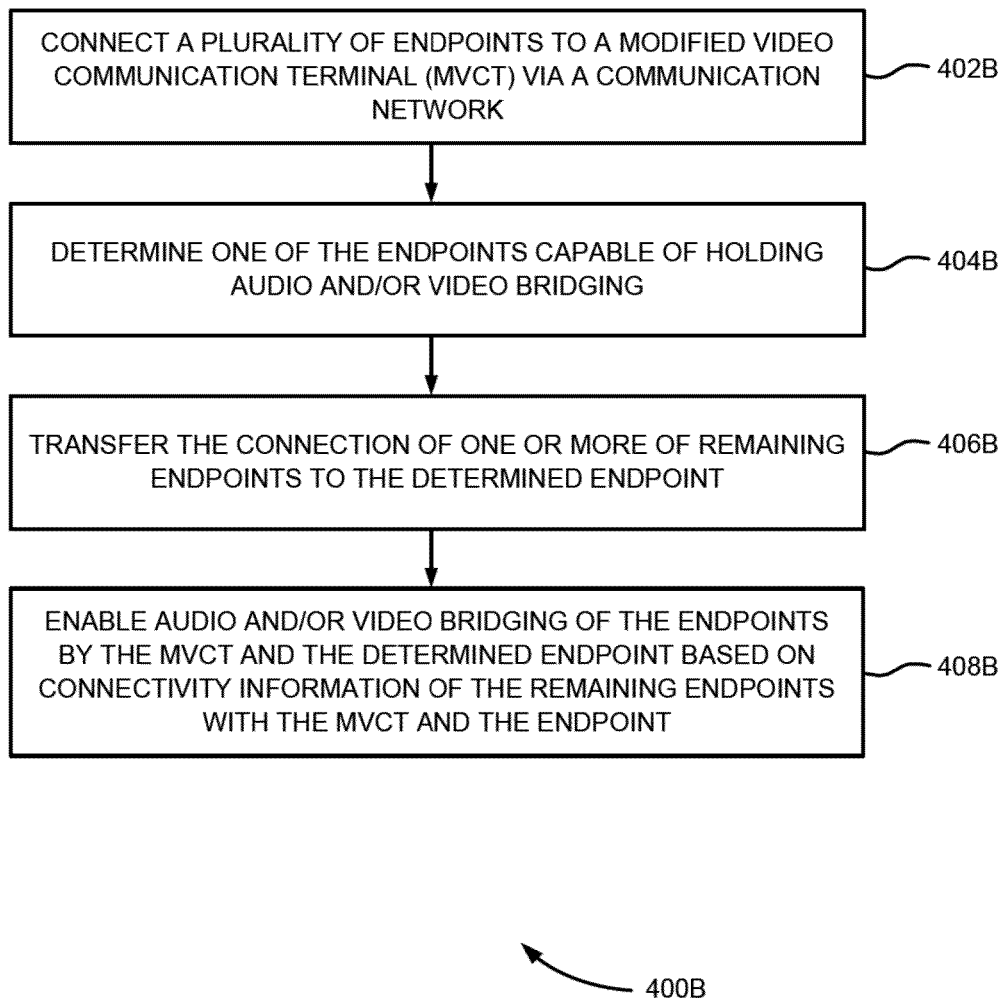
FIG. 4B illustrates a flow diagram of another example method for distributed audio/video bridging for conferencing endpoints, according to one embodiment.

Referring now to FIG. 4B, which illustrates a flow diagram 400B of another example method for distributed audio/video bridging for conferencing endpoints, according to one embodiment. At block 402B, a plurality of endpoints are connected to a MVCT via a communication network. The MVCT including an AVBM is a central server which can acts as a bridge. In other words, the MVCT can only bridge the participants and cannot participate in the conference. At block 404B, one of the endpoints capable of holding audio and/or video bridging is determined by the AVBM. In an example implementation, current load of the MVCT is determined by the AVBM upon connecting the endpoints to the MVCT. Further in the example implementation, the one of the endpoints capable of holding the audio and/or video bridging is determined by the AVBM when the current load of the MVCT exceeds a threshold value. In one example, the one of the endpoints capable of holding the audio and/or video bridging is determined based on hardware, software and networking capabilities of the one of the endpoints.

At block 406b, the connection of one or more remaining endpoints is transferred to the determined endpoint by the AVBM for load balancing. At block 408B, audio and/or video bridging of the endpoints is enabled by the AVBM and the determined endpoint based on connectivity information of the remaining endpoints with the MVCT and the determined endpoint for conferencing participants. In an example implementation, the MVCT and the determined endpoint are synchronized by the AVBM. Upon synchronizing the MVCT and the determined endpoint, the audio and/or video bridging of the endpoints is enabled by the AVBM and the determined endpoint based on connectivity information of the remaining endpoints with the MVCT and the determined endpoint. In one embodiment, the audio and/or video bridging of audio and/or video streams the endpoints connected to the MVCT is enabled by the AVBM. Further, the audio and/or video bridging of audio and/or video streams of the determined endpoint and the endpoints connected to the determined endpoint is enabled by the determined endpoint.

In some embodiments, current load of the MVCT is determined by the AVBM when a new endpoint is connecting to the MVCT. The new endpoint is then transferred to any endpoint capable of holding audio and/or video bridging by the AVBM when the current load of the MVCT exceeds the threshold value. The process of distributed audio/video bridging for conferencing endpoints is described in more detail with reference to FIGS. 1A-3 and 5-7G.

Figure 5:
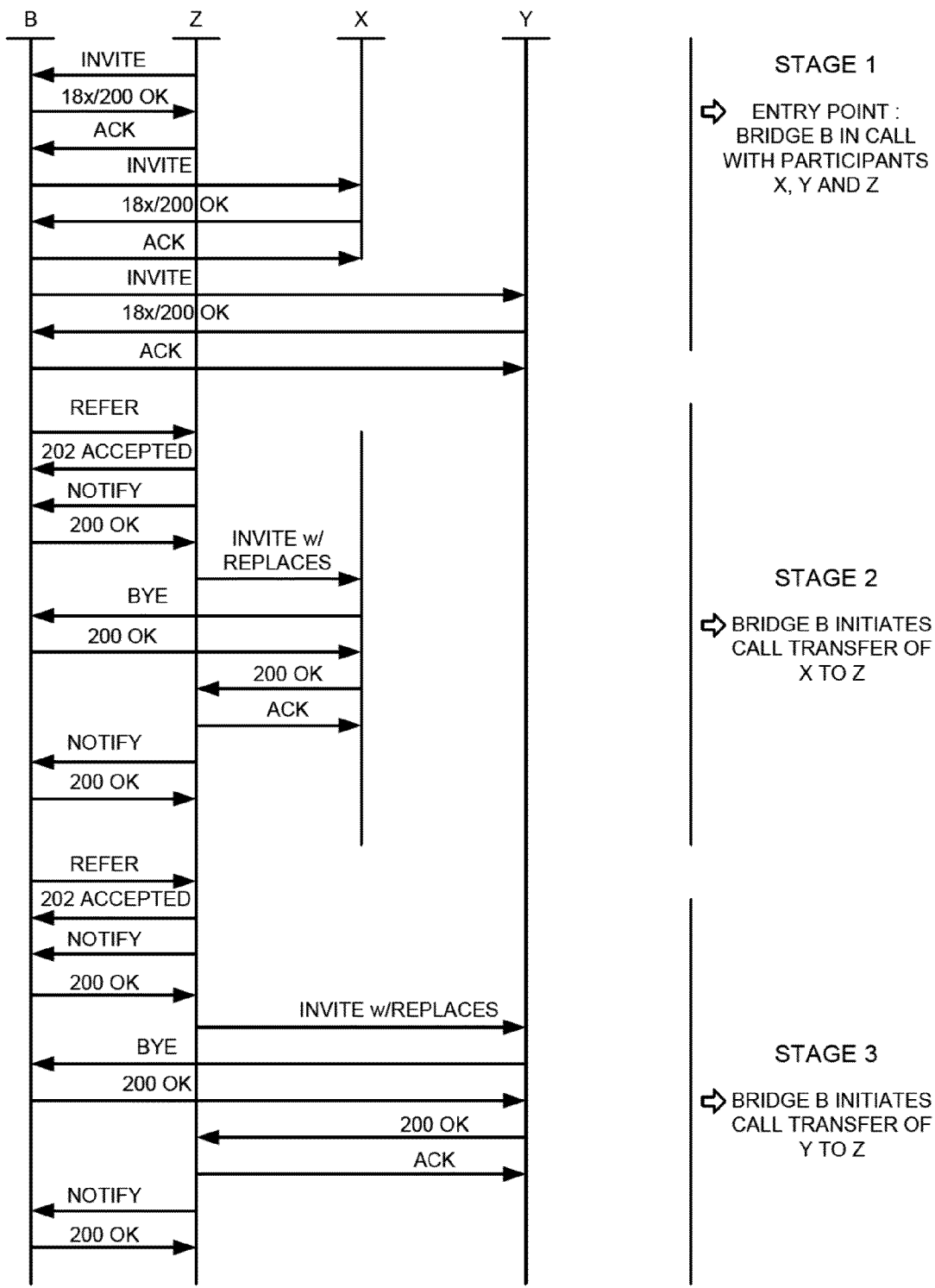
FIG. 5 illustrates a flow diagram of an exemplary call transfer for shifting participants from one bridge to another bridge during distributed audio/video bridging enabled audio and/or video conferencing, according to one embodiment.

Referring now to FIG. 5, which illustrates a flow diagram 500 of an exemplary call transfer for shifting participants from one bridge to another bridge during distributed audio/video bridging enabled audio and/or video conferencing, according to one embodiment. In the example illustrated in FIG. 5, there are three stages in shifting participants in a conference. The stage 1 is a bridging scenario with a bridge in conference with participants. Particularly, the stage 1 describes a situation where an endpoint enters into a conference with other participants. In this case, B is the bridge that hosts the conference between X, Y and Z. Further, the stage 2 describes transfer of one or more participants from the bridge to another bridge and/or another participant capable of bridging. Particularly, the stage 2 describes a situation where B acts as a transferor and a participant Z which is capable of bridging acts as a transfer target. participant X gets transferred from B to Z as shown in FIG. 5. In this scenario, the transferor, B, doesn't terminate session with the transfer target, Z. In this case, there are multiple bridges in the conference and a DBM in B handles the situation by sending appropriate content to each participant.

Furthermore, the stage 3 describes the bridge transferring participants to another bridge and/or another participant capable of bridging until it is no longer performing bridging. In this case, the bridge may or may not remain connected to the conference. Particularly, the stage 3 describes a situation where B continues to act as the transferor and the participant Z as the transfer target. Participant Y gets transferred from B to Z as shown in FIG. 5. For example, REFER message shown in FIG. 5 contains information about the transfer target and the call session in progress between the transferor and the transfer target. REPLACES message contains information about the call session in progress between the transferor and transfer target. In this scenario, the transferor, B, doesn't terminate session with the transfer target, Z. Transfer is complete and B no longer performs bridging. In this case, the situation is again that of a single bridge in the conference, namely Z.

Even though FIG. 5 is explained with reference to an attended call transfer method, one can use a blind call transfer method or a call forwarding scenario. In some embodiments, the call forwarding scenario is explained using a SIP protocol but can be extended to other protocols as well. An incoming call INVITE carries with it the capabilities of the endpoint and the basic requirements to enter into a call with it. This information can be used by the DBM to determine a suitable BCP to support the new participant as part of the conference. The DBM does a SIP call forwarding in this scenario to identify the suitable BCP.

Figure 6A:
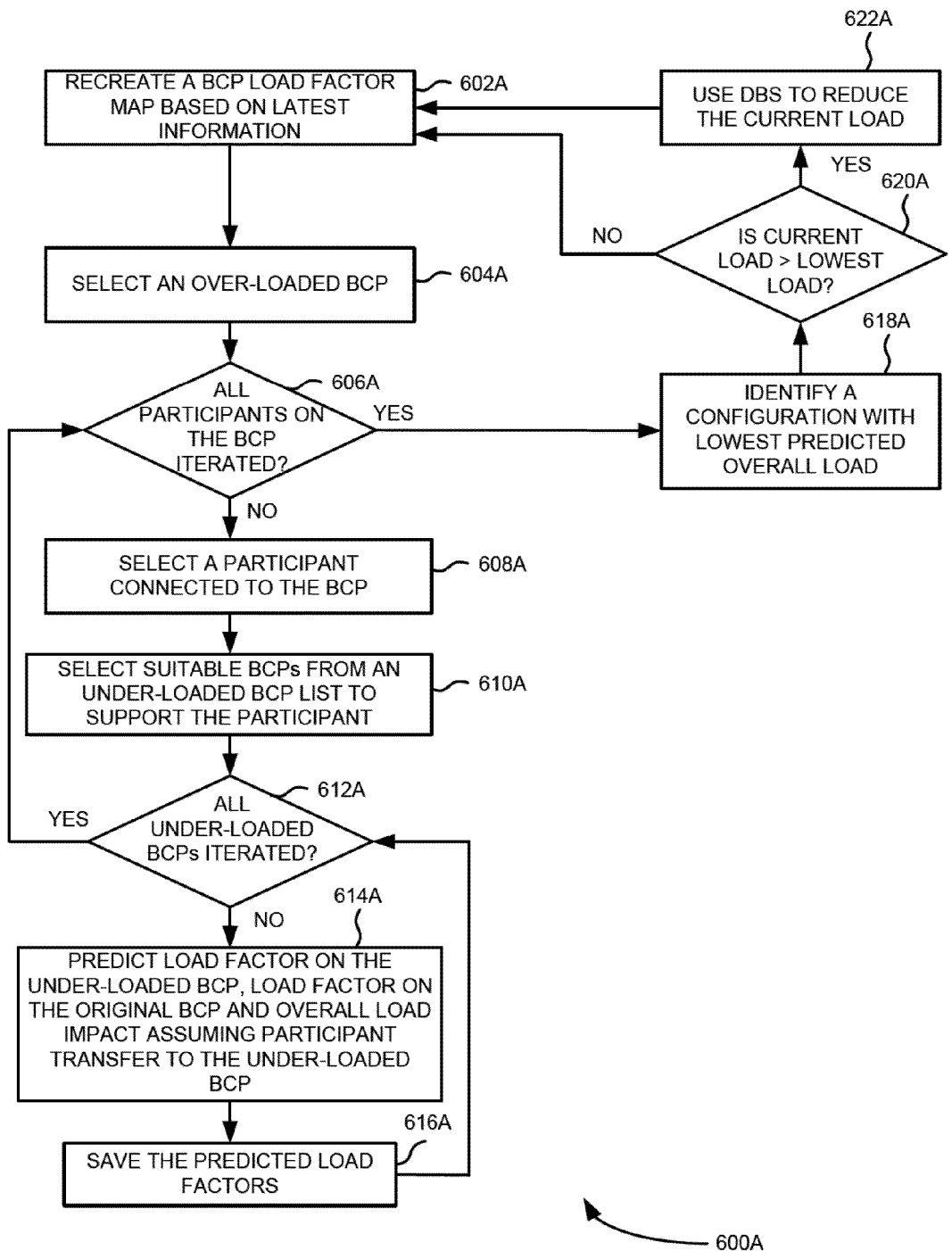
FIGS. 6A-6C illustrate flow diagrams of example methods for load optimization during distributed audio/video bridging enabled audio and/or video conferencing, according to one embodiment.
Figure 6B:
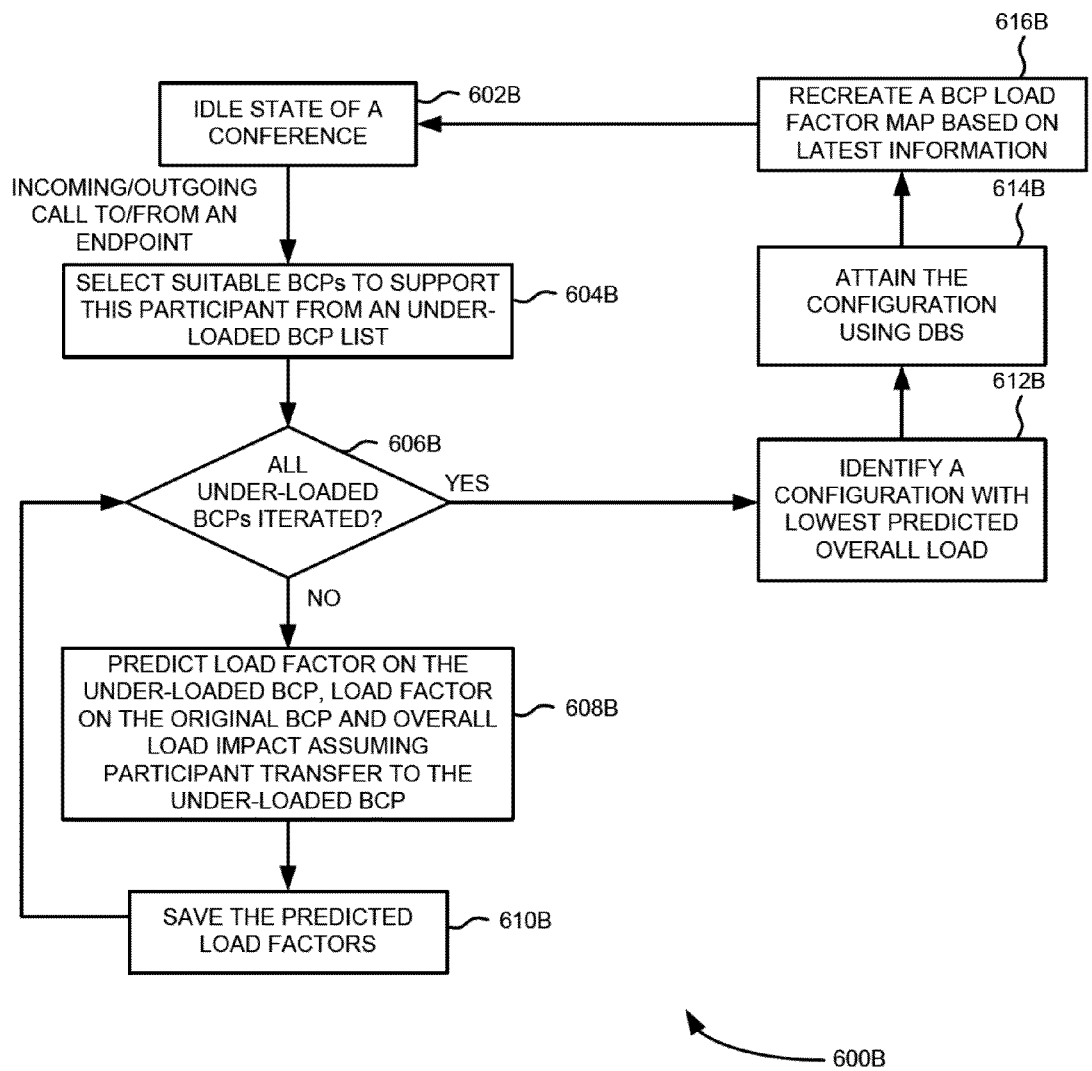
Figure 6C:
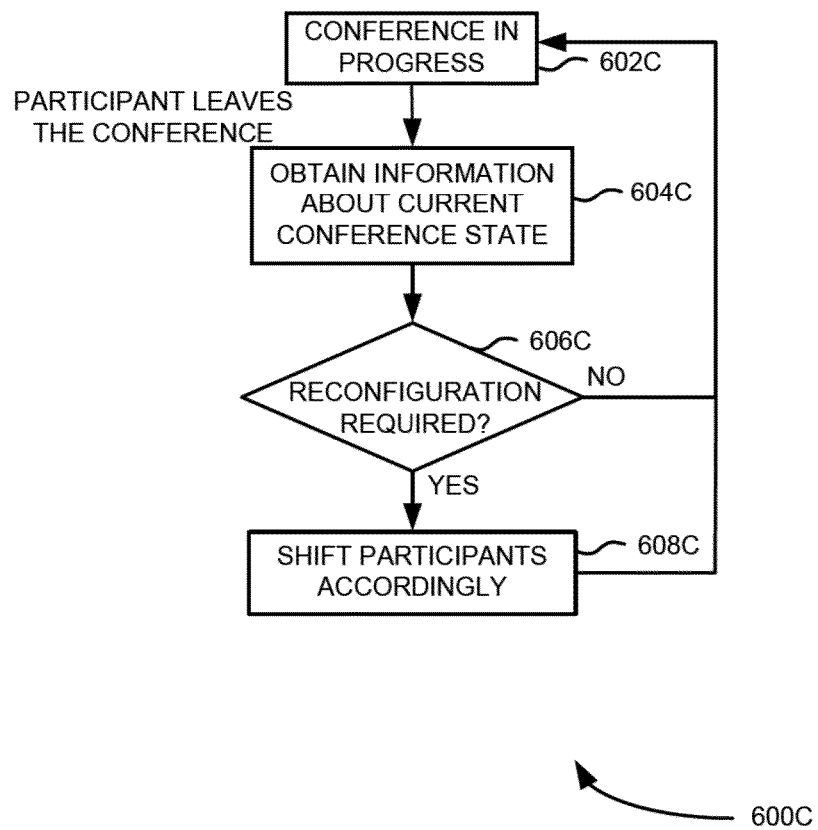

Referring now to FIGS. 6A-6C, which illustrate flow diagrams 600A-600C of example methods for load optimization during distributed audio/video bridging enabled audio and/or video conferencing, according to one embodiment. Particularly, FIG. 6A illustrates the flow diagram 600A of the example method for load optimization in an on-going distributed audio/video bridging enabled audio and/or video conferencing. At block 602A, a BCP load factor map is recreated based on latest information. At block 604A, an over-loaded BCP is selected. At block 606A, a check is made to determine whether all participants on the over-loaded BCP iterated. If all the participants on the over-loaded BCP are not iterated, a participant connected to the over-loaded BCP is selected at block 608A. At block 610A, suitable BCPs are selected from an under-loaded BCP list to support the participant. At block 612A, a check is made to determine whether all under-loaded BCPs are iterated. If all the under-loaded BCPs are iterated, process steps from block 606A are repeated. If all the under-loaded BCPs are not iterated, load factor on the under-loaded BCP, load factor on the original BCP and overall load impact assuming participant transfer to the under-loaded BCP are predicted at block 614A. At block 616A, the predicted load factors are saved and the process steps from block 612A are repeated.

If all the participants on the over-loaded BCP are iterated, a configuration with lowest predicted overall load is identified at block 618A. At block 620A, a check is made to determine whether current load is greater than the lowest load. If the current load is less than the lowest load, the process steps from block 602A are repeated. If the current load is greater than the lowest load, distributed bridge shifting is used to reduce the current load at block 622A and the process steps from block 602A are repeated.

Particularly, FIG. 6B illustrates the flow diagram 600B of the example method for load optimization when a participant joins the distributed audio/video bridging enabled audio and/or video conferencing. At block 6026, a state of the conference is idle. When an incoming/outgoing call to/from an endpoint is made, suitable BCPs to support this participant are selected from an under-loaded BCP list at block 604B. At block 606B, a check is made to determine whether all under-loaded BCPs are iterated.

If all the under-loaded BCPs are not iterated, load factor on the under-loaded BCP, load factor on the original BCP and overall load impact assuming participant transfer to the under-loaded BCP are predicted at block 6086. At block 610B, the predicted load factors are saved and the process steps from block 606B are repeated. If all the under-loaded BCPs are iterated, a configuration with lowest predicted overall load is predicted at block 612B. At block 6146, the configuration is attained using the distributed bridge shifting. At block 616B, a BCP load factor map is recreated and the process steps from block 6026 are repeated.

Particularly, FIG. 6C illustrates the flow diagram 600C of the example method for load optimization when a participant leaves the distributed audio/video bridging enabled audio and/or video conferencing. At block 602C, the conference is in progress. When a participant leaves the conference, information about the conference state is obtained at block 604C. At block 606C, a check is made to determine whether reconfiguration is required. If the reconfiguration is required, participants are shifted accordingly at block 608C and the process steps from block 602C are repeated. If the reconfiguration is not required, the process steps from block 602C are repeated.

Figure 7B:
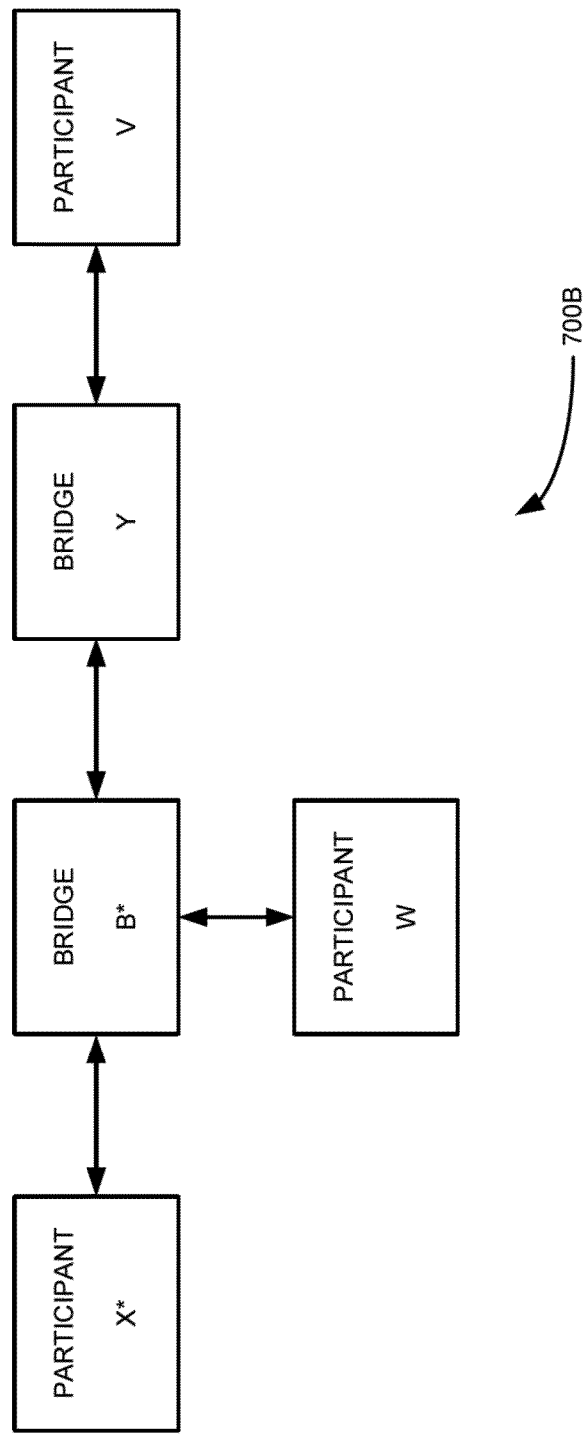
Figure 7C:
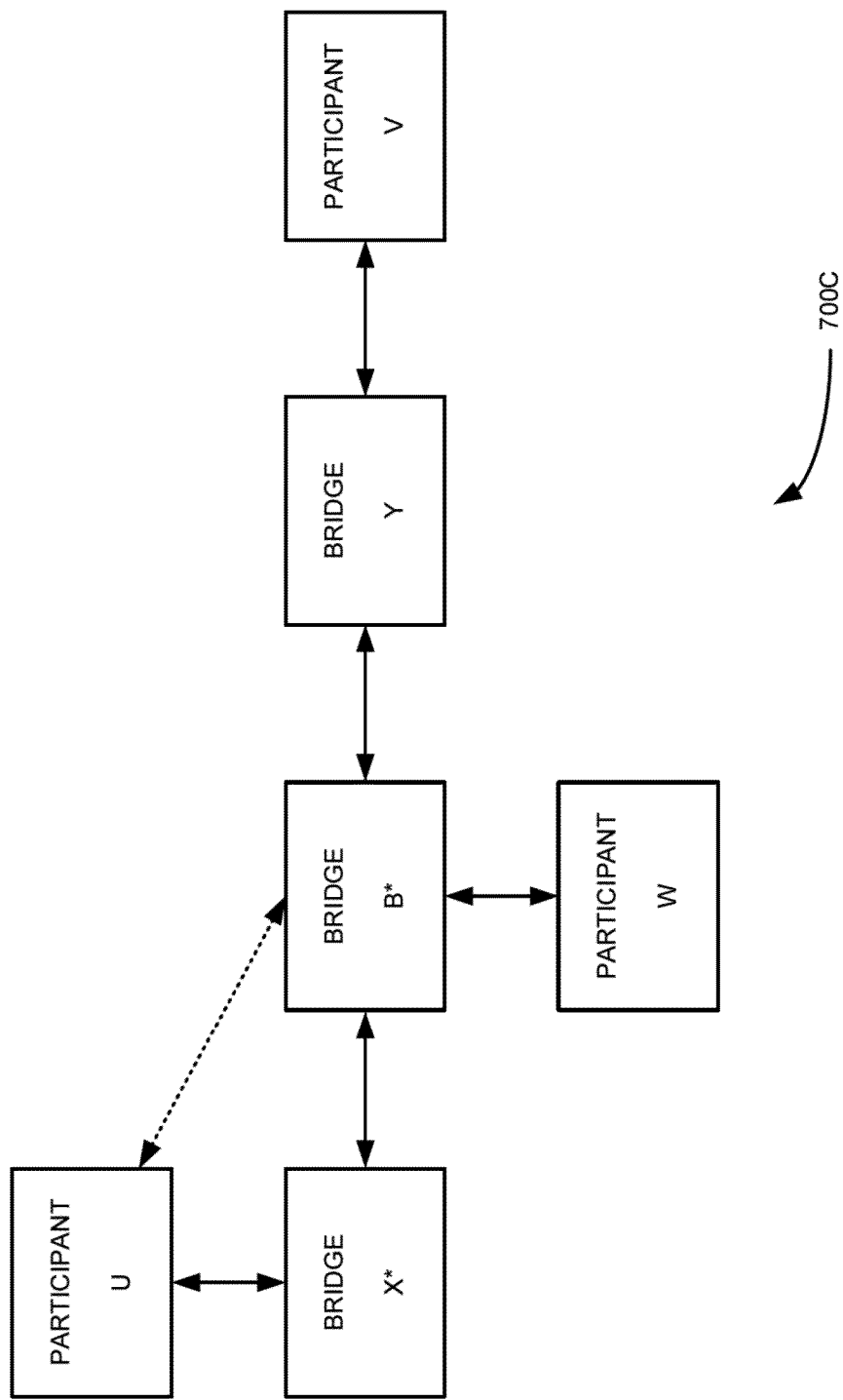
Figure 7D:
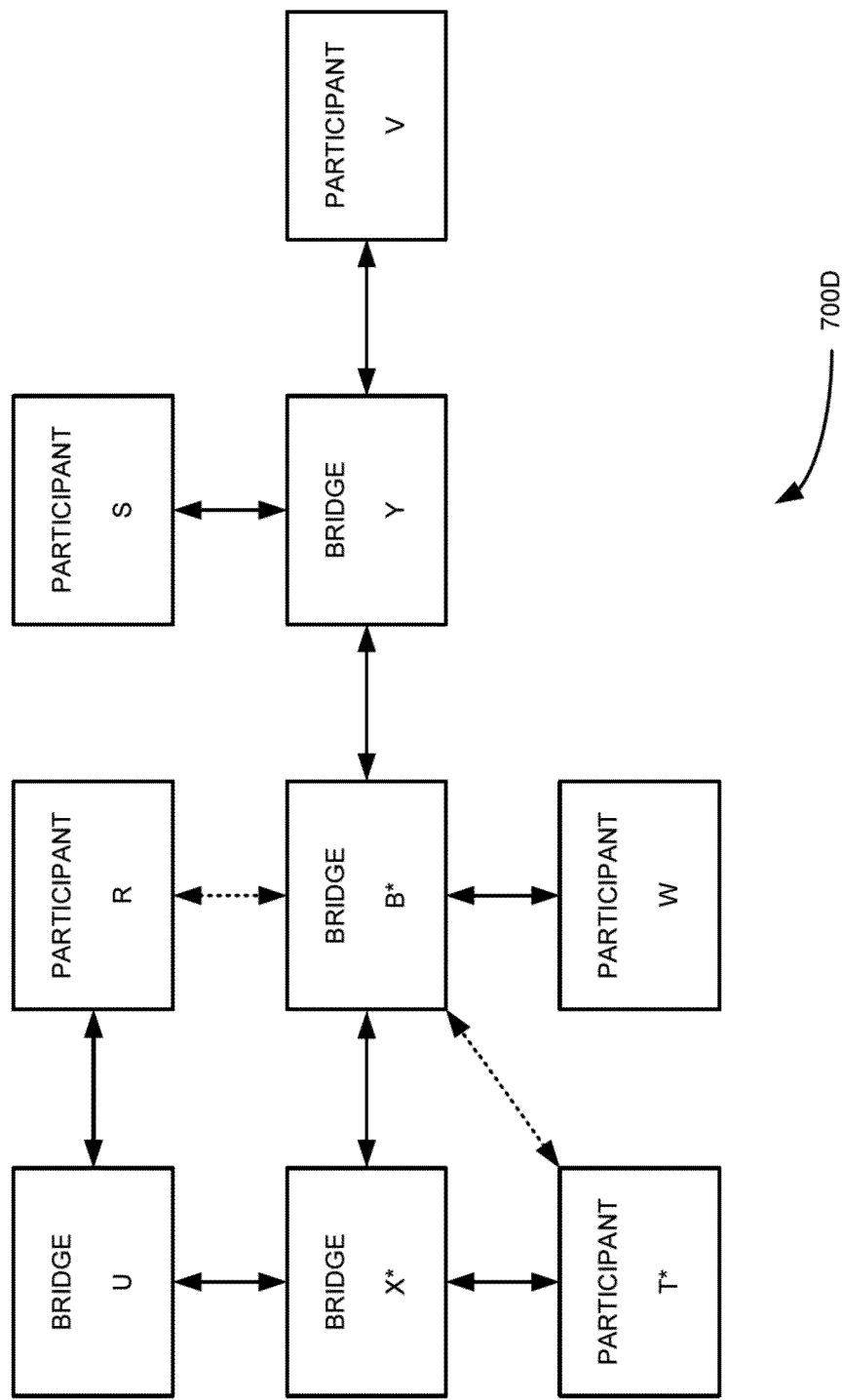

Referring now to FIGS. 7A-7G, which illustrate block diagrams 700A-700G of example distributed audio/video bridging enabled conferencing systems, according to one embodiment. Particularly, FIG. 7A illustrates the block diagram 700A including a bridge with DBM (B*) in call with a DBM based endpoint (X*) and a non-DBM based endpoint (Y). In the example illustrated in FIG. 7A, B* makes an outgoing call to participant W which is a non-DBM based endpoint. From W's response to the invite from B*, the capabilities of W are known. An optimizer in B* makes an assessment of the best endpoint to support W at this point. If B* is not suitable, then it establishes a signaling-only session between W and B*. Then a DBS module in B* is used to shift the participant W to a better suited BCP. In this case, however, B* is a suitable bridge for participant W and the session continues. In this scenario, if X* is a dominant speaker, then a video stream associated with X* selected by B is displayed on all the endpoints.

Particularly, FIG. 7B illustrates the block diagram 700B including the bridge with DBM (B*) in call with the DBM based endpoint (X*), the non-DBM based endpoint (Y) and the non-DBM based endpoint (W). In the example illustrated in FIG. 7B, a participant V which is a non-DBM based endpoint makes an incoming call to Y. The DBM in B* detects it when a participant connected on it has become a bridge using a communicator in the DBM. Based on this, it acts accordingly to ensure that a video stream of a dominant speaker gets displayed on all the participants connected to it. Y which is the non-DBM based endpoint enters bridging. There are 2 kinds of conferencing possible here:

1. V functions based on ASD or GBD. In this case, video layouts are based on the dominant speaker. GBD and ASD are mechanisms that help identify which participant's video to choose to display. ASD based detection is described below.

a) Original Bridge with DBM (B*) as a primary bridge:
When the dominant speaker is from a segment (B*$_Y$), B* will receive its streams and act as the primary bridge. For example, the term primary bridge refers to the bridge on which the current dominant speaker is connected. The term 'segment' is used to refer to a subset of participants between two bridges in the conference. Here, segment refers to a bridge and any participant connected on it, other than the reference bridge. A segment is always defined in terms of the bridge under consideration and a reference bridge. In this case, the bridge under consideration is Y and the reference is B. So, segment of Y w.r.t B (segment (Y$_B$)) refers to W and Y. Similarly, segment (B*$_Y$) refers to B, X and Z. In this case, B* will compose the video stream of the dominant speaker and send it to all the connected participants. For example, if W is the dominant speaker, B* forwards the video stream from W to all the participants connected on B* and displays it locally as well. Since Y is a bridge that works based on ASD, it detects that the dominant speaker's video stream are those it receives from B*. So it displays these streams locally and forwards them to V as well. V may or may not send the streams from B* back to it. In any case, B* doesn't act on these streams as they do not contain audio streams of the dominant speaker. In this scenario, bridge B* displays the video stream of the dominant speaker chosen by B*, i.e., W, participant X* displays the video stream of the dominant speaker chosen by B*, i.e., W, participant W displays the video stream of the dominant speaker chosen by B*, i.e., W, bridge Y displays the video stream of the dominant speaker chosen by Y, i.e., streams from B*, i.e., W and participant V displays the dominant speaker chosen by Y, i.e., streams from B*, i.e., W.

b) BCP turned bridge (Y) as the primary bridge:
When the dominant speaker is from the segment (Y$_B$*), Y becomes the primary bridge. Y sends the dominant speaker's video stream to B* and its own segment. When B* detects that the video stream from Y is that of the dominant speaker, it forwards it to all participants connected to it except Y, i.e., on the segment (B*$_Y$). B does this by maintaining information that Y is a bridge by itself and takes this action when it knows that the stream it receives is already bridge composed. This information is available to a synchronizer from the communicator in the DBM. This prevents the redundant stream from being sent to the bridge Y. For example, if V is the dominant speaker, Y forwards the video streams from V to all participants connected on it and displays it locally as well. Since B* is the bridge with the DBM, it detects that the dominant speaker's video streams are those it receives from Y, the BCP that has started bridging. So B* displays these streams locally and forwards them to the segment ($B^*_Y$). The DBM ensures that the redundant streams are not sent back to Y. In this scenario, bridge B* displays the video stream of the dominant speaker chosen by B*, i.e., streams from Y, i.e., V, participant X* displays the video stream of the dominant speaker chosen by B*, i.e., streams from Y, i.e., V, participant W displays the video stream of the dominant speaker chosen by B*, i.e., streams from Y, i.e., V, bridge Y displays the video stream of the dominant speaker chosen by Y, i.e., V and participant V displays the dominant speaker chosen by Y, i.e., V. Even though it is explained with reference to ASD, one can envision that GBD can be used to identify the dominant speaker.

2. Y creates a matrix video layout of some or all participants connected to it.

a) Original bridge with DBM (B*) as the primary bridge:
When the dominant speaker is from the segment ($B^*_Y$), B* will receive its streams and act as the primary bridge. It will compose the video stream of the dominant speaker and send it to all the connected participants. For example, if W is the dominant speaker, B* forwards the video streams from W to all participants connected on it and displays it locally as well. X*, B* and W display the video stream of the dominant speaker from the segment ($B^*_Y$). Y is the bridge that composes the layout based on the video streams it receives from all participants connected on it. It might be a layout matrix with streams of all participants composed into one stream. Y composes the dominant speaker's video sent by B* as part of the layout matrix. Y displays this composed stream locally and forwards them to V and B*. B* doesn't act on this stream as they do not contain audio streams of the dominant speaker. In this case, bridge B* displays the video stream of the dominant speaker chosen by B*, i.e., W, participant X* displays the video stream of the dominant speaker chosen by B*, i.e., W, participant W displays the video stream of the dominant speaker chosen by B*, i.e., W, bridge Y displays layout matrix with video streams of Y, V and the dominant speaker video from B* and participant V displays layout matrix with video streams of Y, V and the dominant speaker video from B*.

b) BCP turned Bridge (Y) as the primary bridge:
When the dominant speaker is from the segment ($Y_B^*$), Y becomes the primary bridge. Y sends the video stream composed by it to B* and its own segment. When B* detects that the video stream from Y is that of the dominant speaker, it forwards it to all participants connected to it except Y, i.e., on the segment ($B^*_Y$). The stream composed by Y has Y, V and the stream that B* sends to Y. B* could choose to send streams of the last dominant speaker or of itself to Y. For example, if V is the dominant speaker, forwards the composed video stream containing V, Y and B's video to all participants connected on it and displays it locally as well. Since B* is the bridge with the DBM, it detects that the dominant speaker's video streams are those it receives from Y, the BCP that has started bridging. So it displays these streams locally and forwards them to the other participants on the segment ($B^*_Y$). A Synchronizer on B* ensures that the redundant streams are not sent back to Y. In this case, B* displays the video stream of the dominant speaker chosen by B*, i.e., composed stream from Y, i.e., V, Y and B*, participant X* displays the video stream of the dominant speaker chosen by B*, i.e., composed stream from Y, i.e., V, Y and B*, participant W displays the video stream of the dominant speaker chosen by B*, i.e., composed stream from Y, i.e., V, Y and B*, Y displays the composed stream from Y i.e., V, Y and B*, and participant V displays the composed stream from Y, i.e., V, Y and B*.

Particularly, the block diagram 7000 illustrates ongoing conference with two active connected bridges, B* and Y. Participants X* and W are connected to B* while participant V is connected to Y. Participant U, a non-SBM based endpoint, makes an incoming call to B*. When B* receives the incoming call Invite, it gathers the capabilities of U. This information is passed to the optimizer to identify a best possible BCP to support U. The optimizer identifies X* to be the suitable BCP. Standard or proprietary DBS techniques are applied to shift participant U to X*. With this, X* starts Bridging. So there are three bridges. Since X* and B* are DBM based endpoints. The two scenarios covered here involve interaction between X* and B* for dominant speakers on each of them. With respect to Y, there is no difference in behavior due to the addition of a participants on the segment ($B^*_Y$). It simply expects a video stream from B*. Y and V have either the dominant speaker layout or the video matrix layout depending on the kind of bridge.

If the dominant speaker is U, bridge B* displays the video stream of the dominant speaker chosen by B*, i.e., composed stream from X*, i.e., U, bridge X* displays the video stream of the dominant speaker chosen by X*, i.e., U, participant W displays the video stream of the dominant speaker chosen B*, i.e., composed stream from X*, i.e., U and participant U displays the video stream of the dominant speaker chosen by X*, i.e., U. If the dominant speaker is W, bridge B* displays the video stream of the dominant speaker chosen by B*, i.e., W, participant X* displays the video stream of the dominant speaker chosen X*, i.e., composed stream from B*, i.e., W, participant W displays the video stream of the dominant speaker chosen by B*, i.e., W, and participant U displays the video stream of the dominant speaker chosen by X*, i.e., composed stream from B* i.e., W. In these scenarios, there is no processing required in the interfacing between two DBMs that are working based on ASD or GBD. The technology by itself handles the scenario. Miscellaneous communication can happen between DBMs X* and B* using the communicators to further optimize the conference. In this scenario, B* is the master bridge and X* uses the communicator to request B* to make decisions and/or pass information.

Figure 7E:
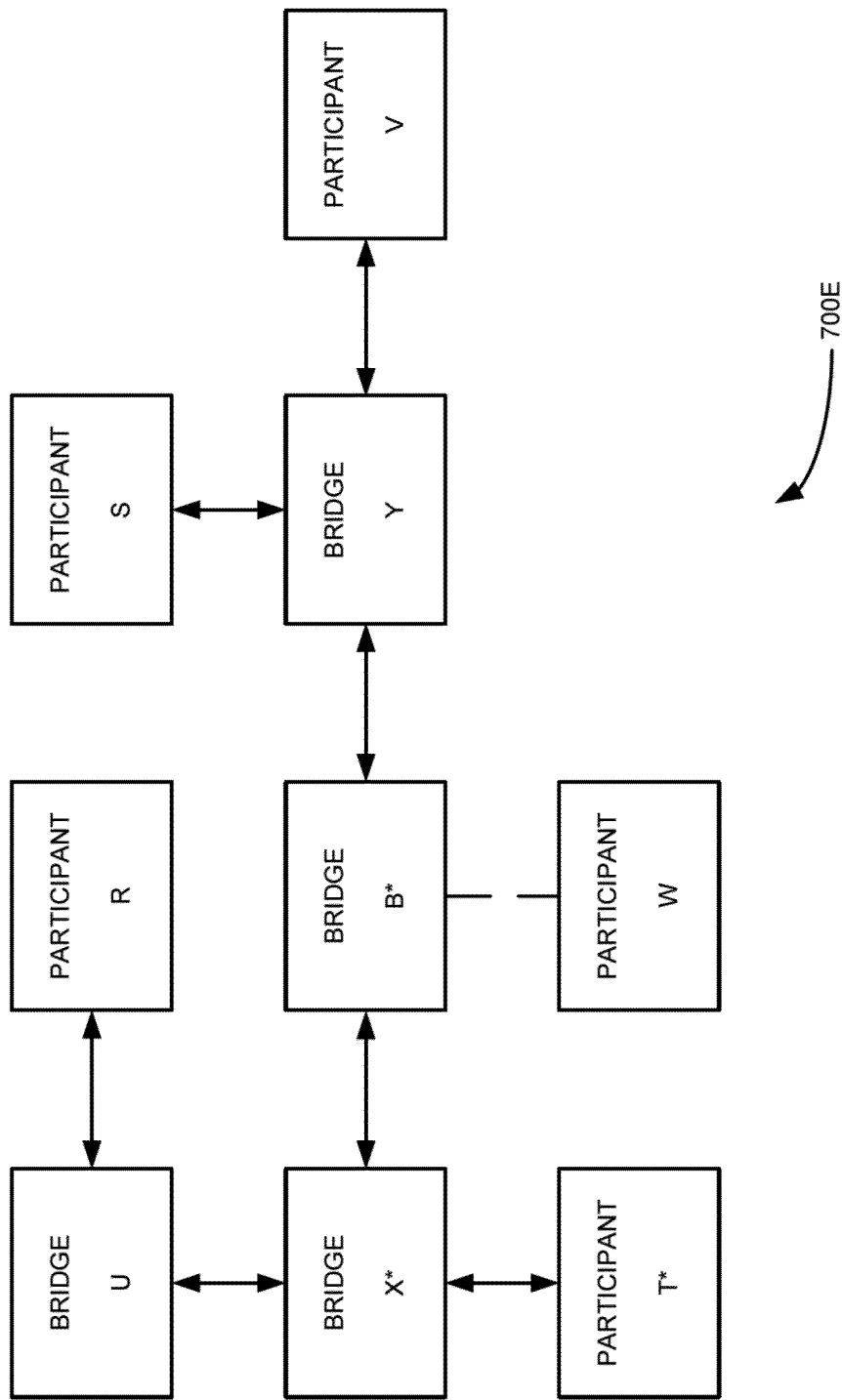
Figure 7F:
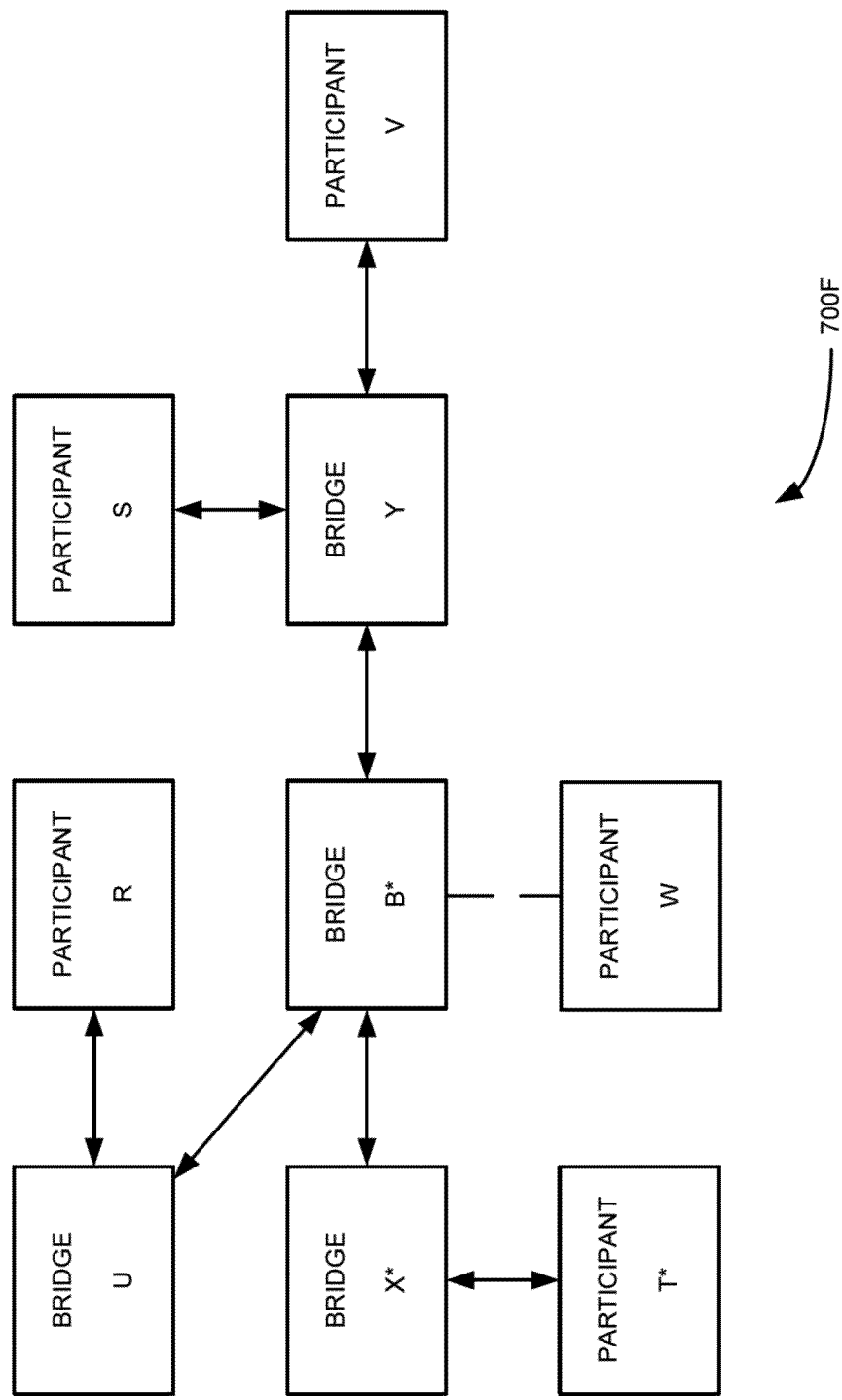
Figure 7G:
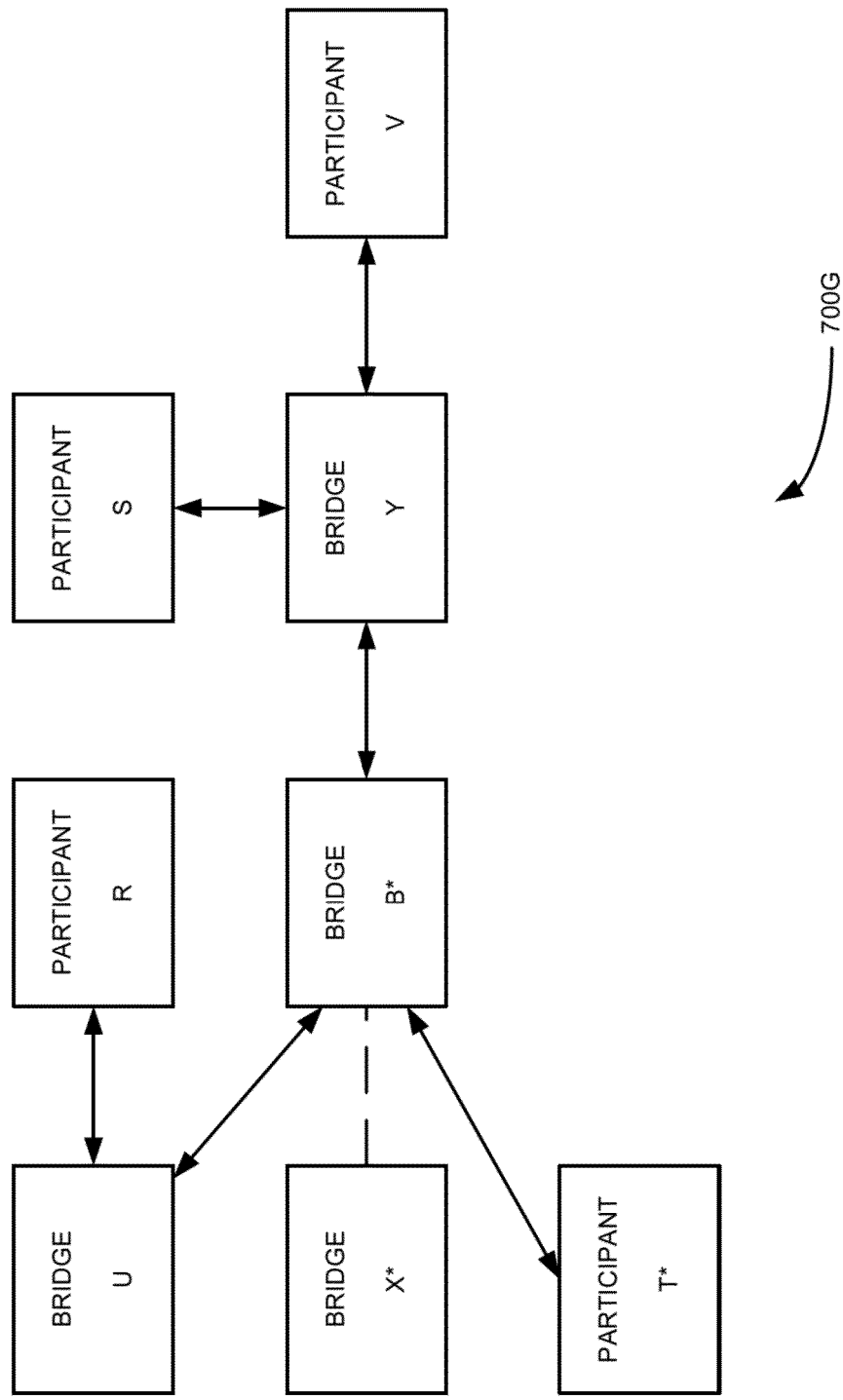

Particularly, the block diagram 700D illustrates ongoing conference with three active connected bridges, B*, X* and Y. Participants W is connected to B*, participant V is connected to Y and participant U is connected to X. Incoming call is made by participant T* to B* and participant R to B*. When B* receives the incoming call Invite from T*, it gets the capabilities of T*. It runs this information through the optimizer. In this case, the optimizer identifies X* to be the suitable BCP. T* is shifted to X* using the DBS module. When B* receives the incoming call invite from R, it gets the capabilities of R. It runs this information through the optimizer. In this case, the optimizer identifies U to be the suitable BCP. R is shifted to U using the DBS. U becomes a bridge and the conference has four active connected bridges (as shown in FIG. 7E).

Further, Bridge Y makes an outgoing call to S which accepts it. Bridge continues bridging in the same fashion. This addition does not affect the conference in any way. Since, Y is the non-DBM endpoint, it does not embody many of the functionalities that help to optimize the conference. The master DBM is unable to request certain behavior from this endpoint. However, it ensures that the co-existence between DBM and non-DBM endpoints is not affected using the synchronizer. The conference can continue growing by utilizing the bridging ability of any endpoint connected to the DBM. For example, even though T*, R and W are not utilized in this scenario, information about them is available to B* through the communicator (information about T* and W is constantly gathered through the communicator. Information about R was gathered by B* before DBS. If R were DBM based, B* would directly communicate with it). If these endpoints are also bridge capable, they could be used to optimize load or support more participants.

Particularly, the block diagram 700F illustrates ongoing conference with four active connected bridges, B*, X*, W and Y. In one example, participant W decides to leave the conference. Immediately, the optimizer takes action by reconfiguring the system for optimal load distribution. In this case, it might employ DBS to transfer a participant from X* to B*. Here, it transfers bridge U to B*. The conference continues unaffected as the synchronizer in B* will adapt according to the non-DBM based endpoint of U.

Particularly, the block diagram 700G illustrates a continuation of the block diagram 700F, X* might experience a situation where it wants to leave the conference. X* before terminating the call, communicates that it is leaving the conference to the master bridge (B*). The B* requests X* to perform DBS on the existing participants before leaving the conference and also suggests the suitable bridge to shift them. The bridge X* then transfers participant T* to the suggested suitable bridge.

In one embodiment, an article comprising a non-transitory computer readable storage medium having instructions thereon which when executed by a computing platform result in execution of the above mentioned methods. The method described in the foregoing may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In various embodiments, the systems and methods described in FIGS. 1A through 7G propose a technique for distributed audio/video bridging for conferencing endpoints. In other words, the proposed technique enables audio and/or video bridging of the endpoints by more than one bridge. That is the proposed technique utilizes the processing capacity of participants' endpoints during audio and/or video conferencing. Thus, a participant can join the conference by dialing into any participant in the ongoing conference.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for distributed audio/video bridging of endpoints in a conference, comprising:
   connecting a plurality of endpoints to a modified video communication terminal (MVCT) via a communication network, wherein the MVCT is an endpoint participating in the conference and includes an audio/video bridging module (AVBM);
   determining one of the plurality of endpoints capable of holding audio or video bridging by the AVBM;
   transferring the connection of at least one of remaining endpoints to the determined endpoint by the AVBM for load balancing; and
   enabling audio or video bridging of the endpoints and the MVCT by the AVBM and the determined endpoint based on connectivity information of the remaining endpoints with the MVCT and the determined endpoint for conferencing participants.

2. The method of claim 1, wherein enabling audio or video bridging of the endpoints and the MVCT by the AVBM and the determined endpoint based on connectivity information of the remaining endpoints with the MVCT and the determined endpoint for conferencing participants, comprising:
   conferencing the participants by:
      enabling the audio or video bridging of audio or video streams of the MVCT and the endpoints connected to the MVCT by the AVBM; and
      enabling the audio or video bridging of audio or video streams of the determined endpoint and the endpoints connected to the determined endpoint by the determined endpoint.

3. The method of claim 1, wherein determining, one of the plurality of endpoints capable of holding audio or video bridging by the AVBM, comprises:
   determining current load of the MVCT upon connecting the plurality of endpoints to the MVCT by the AVBM; and
   determining the one of the plurality of endpoints capable of holding the audio or video bridging by the AVBM when the current load of the MVCT exceeds a threshold value.

4. The method of claim 3, wherein the one of the plurality of endpoints capable of holding the audio or video bridging is determined based on hardware. software and networking capabilities of the one of the plurality of endpoints.

5. The method of claim 1, further comprising:
   determining current load of the MVCT when a new endpoint is connecting to the MVCT by the AVBM: and
   transferring the new endpoint to any endpoint capable of holding audio or video bridging by the AVBM when the current load of the MVCT exceeds a threshold value.

6. The method of claim 1, further comprising;
   automatically selecting one of the participants or a list of participants; and
   displaying video streams associated with the one of the participants or the list of participants on the plurality of endpoints and the MVCT.

7. The method of claim 6, wherein the one of the participants or the list of participants selected automatically are active participants in the conference.

8. The method of claim 1, wherein enabling audio or video bridging of the endpoints and the MVCT by the AVBM and the determined endpoint based on connectivity information of the remaining endpoints with the MVCT and the determined endpoint for conferencing participants, comprises:
   synchronizing the MVCT and the determined endpoint by the AVBM; and
   enabling the audio or video bridging of the endpoints and the MVCT by the AVBM and the determined endpoint based on connectivity information of the remaining endpoints with the MVCT and the determined endpoint upon synchronizing the MVCT and the determined endpoint.

9. The method of claim 1, wherein the endpoint comprises video communication terminals (VCTs) and voice over Internet protocol (IP) communication terminals (VoCTs), wherein the VCTs include terminals capable of video communication over IP and wherein the VoCTs include stand-alone or in-built terminals capable of audio communication over IP.

10. A system, comprising:
a modified video communication terminal (MVCT) wherein the MVCT is an endpoint participating in the conference and includes an audio/video bridging mmodule(AVBM); and
a plurality of endpoints connected to the MVCT via a communication network, wherein the AVBM determines one of the plurality of endpoints capable of holding audio or video bridging, wherein the AVBM transfers the connection of at least one of remaining endpoints to the determined endpoint for load balancing and wherein the AVBM and the determined endpoint enable audio or video bridging of the endpoints and the MVCT based on connectivity information of the remaining endpoints with the MVCT and the determined endpoint for conferencing participants.

11. The system of claim 10, wherein the AVBM is configured to enable the audio or video bridging of audio or video streams of the MVCT and the endpoints connected to the MVCT and wherein the determined endpoint is configured to enable the audio or video bridging of audio or video streams of the determined endpoint and the endpoints connected to the determined endpoint.

12. The system of claim 10, wherein the AVBM is configured to:
determine current load of the MVCT upon connecting the plurality of endpoints to the MVCT; and
determine the one of the plurality of endpoints capable of holding the audio or video bridging when the current load of the MVCT exceeds a threshold value.

13. The system of claim 12, wherein the one of the plurality of endpoints capable of holding the audio or video bridging is determined based on hardware, software and networking capabilities of the one of the plurality of endpoints.

14. The system of claim 10, wherein the AVBM is further configured to:
determine current load of the MVCT when a new endpoint is connecting to the MVCT; and
transfer the new endpoint to an endpoint capable of holding audio or video bridging when the current load of the MVCT exceeds a threshold value.

15. The system of claim 10, wherein the endpoint comprises video communication terminals (VCTs) and voice over Internet protocol (IP) communication terminals (VoCTs), wherein the VCTs include terminals capable of video communication over IP and wherein the VoCTs include stand-alone or in-built terminals capable of audio communication over IP.

16. A method for distributed audio/video bridging for conferencing Endpoints, comprising:
connecting a plurality of endpoints to a modified video communication terminal (MVCT) via a communication network, wherein the MVCT is a central server including an audio/video bridging module (AVBM);
determining current load of the MVCT upon connecting the plurality of endpoints to the MVCT by the AVBM; and
determining one of the plurality of endpoints capable of holding, audio or video bridging by the AVBM when the current load of the MVCT exceeds a threshold value;
transferring, the connection of at least one of remaining endpoints to the determined endpoint by the AVBM for load balancing; and
enabling audio or video bridging of the endpoints by the AVBM and the determined endpoint based on connectivity information of the remaining endpoints with the MVCT and the determined endpoint for conferencing participants.

17. The method of claim 16, wherein enabling audio or video bridging of the endpoints by the AVBM and the determined endpoint based on connectivity information of the remaining endpoints with the MVCT and the determined endpoint for conferencing participants, comprising:
conferencing the participants by:
enabling the audio or video bridging of audio or video streams of the endpoints connected to the MVCT by the AVBM: and
enabling the audio or video bridging of audio or video streams of the determined endpoint and the endpoints connected to the determined endpoint by the determined endpoint.

18. The method of claim 16, wherein the one of the plurality of endpoints capable of holding the audio or video bridging is determined based on hardware, software and networking capabilities of the one of the plurality of endpoints.

19. The method of claim 16. further comprising:
determining current load of the MVCT when a new endpoint is connecting to the MVCT by the AVBM and
transferring the new endpoint to any endpoint capable of holding audio or video bridging by the AVBM when the current load of the MVCT exceeds a threshold value.

20. The method of claim 16, wherein enabling audio or video bridging of the endpoints by the AVBM and the determined endpoint based on connectivity information of the remaining endpoints with the MVCT and the determined endpoint for conferencing participants, comprises:
synchronizing the MVCT and the determined endpoint by the AVBM; and
enabling the audio or video bridging of the endpoints by the AVBM and the determined endpoint based on connectivity information of the remaining endpoints with the MVCT and the determined endpoint upon synchronizing the MVCT and the determined endpoint.

21. The method of claim 16. wherein the endpoint comprises video communication terminals (VCTs) and voice over Internet protocol (IP) communication terminals (VoCTs), wherein the VCTs include terminals capable of video communication over IP and wherein the VoCTs include stand-alone or in-built terminals capable of audio communication over IP.

22. A system, comprising:
a modified video communication terminal (MVCT), wherein the MVCT is a central server including an audio/video bridging module (AVBM); and
a plurality of endpoints connected to the MVCT via a communication network, wherein the AVBM determines current load of the MVCT upon connecting the plurality of endpoints to the MVCT, wherein the AVBM determines one of the plurality of endpoints capable of holding audio or video bridging when the current load of the MVCT exceeds a threshold value, wherein the AVBM transfers the connection of at least one of remaining endpoints to the determined endpoint for load balancing and wherein the AVBM and the determined endpoint enable audio or video bridging of the endpoints based on connectivity information of the remaining endpoints with the MVCT and the determined endpoint for conferencing participants.

23. The system of claim 22, wherein the AVBM is configured to enable the audio or video bridging of audio or video streams of the endpoints connected to the MVCT and wherein the determined endpoint is configured to enable the audio or video bridging of audio or video streams of the determined endpoint and the endpoints connected to the determined endpoint.

24. The system of claim 22, wherein the one of the plurality of endpoints capable of holding the audio or video bridging is determined based on hardware, software and networking capabilities of the one of the plurality of endpoints.

25. The system of claim 22, wherein the AVBM is further configured to:
   determine current load of the MVCT when a new endpoint is connecting to the MVCT; and
   transfer the new endpoint to any endpoint capable of holding audio or video bridging when the current load of the MVCT exceeds a threshold value.

26. The system of claim 22, wherein the endpoint comprises video communication terminals (VCTs) and voice over Internet protocol (IP) communication terminals (VoCTs), wherein the VCTs include terminals capable of video communication over IP and wherein the VoCTs include stand-alone or in-built terminals capable of audio communication over IP.

27. A non-transitory computer-readable storage medium including instructions executable by a computing device to:
   connect a plurality of endpoints to a modified video communication terminal (MVCT) via a communication network, wherein the MVCT is an endpoint including participating in the conference and includes an audio/video bridging module (AVBM);
   determine one of the plurality of endpoints capable of holding audio or video bridging by the AVBM;
   transfer the connection of at least one of remaining endpoints to the determined endpoint by the AVBM for load balancing; and
   enable audio or video bridging of the endpoints and the MVCT by the AVBM and the determined endpoint based on connectivity information of the remaining endpoints with the MVCT and the determined endpoint for conferencing participants.

28. The non-transitory computer-readable storage medium of claim 27, wherein enabling, audio or video bridging of the endpoints and the MVCT by the AVBM and the determined endpoint based on connectivity information of the remaining endpoints with the MVCT and the determined. endpoint for conferencing participants, comprises:
   conferencing the participants by:
      enabling the audio or video bridging of audio or video streams of the MVCT and the endpoints connected to the MVCT by the AVBM; and
      enabling the audio or video bridging of audio or video streams of the determined endpoint and the endpoints connected to the determined endpoint by the determined endpoint.

29. The non-transitory computer-readable storage medium of claim 27, wherein determining one of the plurality of endpoints capable of holding audio or video bridging by the AVBM, comprises:
   determining current load of the MVCT upon connecting the plurality of endpoints to the MVCT by the AVBM; and
   determining, the one of the plurality of endpoints capable of holding the audio or video bridging by the AVBM when the current load of the MVCT exceeds a threshold value.

30. The non-transitory computer-readable storage medium of claim 29, wherein the one of the plurality of endpoints capable of holding, the audio or video bridging is determined based on hardware, software and networking capabilities of the one of the plurality of endpoints.

31. The non-transitory computer-readable storage medium of claim 27, further comprising:
   determining current load of the MVCT when a new endpoint is connecting to the MVCT by the AVBM; and
   transferring the new endpoint to any endpoint capable of holding audio or video bridginq by the AVBM when the current load of the MVCT exceeds a threshold value.

32. The non-transitory computer-readable storage medium of claim 27, wherein enabling audio or video bridging of the endpoints and the MVCT by the AVBM and the determined endpoint based on connectivity information of the remaining endpoints with the MVCT and the determined endpoint for conferencing participants, comprises:
   synchronizing the MVCT and the determined endpoint by the AVBM; and
   enabling the audio or video bridging of the endpoints and the MVCT by the AVBM and the determined endpoint based on connectivity information of the remaining endpoints with the MVCT and the determined endpoint upon synchronizing the MVCT and the determined endpoint.

33. The non-transitory computer-readable storage medium of claim 27, wherein the endpoint comprises video communication terminals (VCTs) and voice over Internet protocol (IP) communication terminals (VoCTs), wherein the VCTs include terminals capable of video communication over IP and wherein the VoCTs include stand-alone or in-built terminals capable of audio communication over IP.

34. A non-transitory computer-readable storage medium including instructions executable by a computing device to:
   connect a plurality of endpoints to a modified video communication terminal (MVCT) via a communication network, wherein the MVCT is a central server including an audio/video bridging module (AVBM);
   determine current load of the MVCT upon connecting the plurality of endpoints to the MVCT by the AVBM; and
   determine one of the plurality of endpoints capable of holding audio or video bridging by the AVBM when the current load of the MVCT exceeds a threshold value;
   transfer the connection of at least one of remaining endpoints to the determined endpoint by the AVBM for load balancing; and
   enable audio or video bridging of the endpoints by the AVBM and the determined endpoint based on connectivity information of the remaining endpoints with the MVCT and the determined endpoint for conferencing participants.

35. The non-transitory computer-readable storage medium of claim 34, wherein enabling audio or video bridging of the endpoints by the AVBM and the determined endpoint based on connectivity information of the remaining endpoints with the MVCT and the determined endpoint for conferencing participants, comprises:
   conferencing the participants by:
      enabling the audio or video bridging of audio or video streams of the endpoints connected to the MVCT by the AVBM; and
      enabling the audio or video bridging of audio or video streams of the determined endpoint and the endpoints connected to the determined endpoint by the determined endpoint.

36. The non-transitory computer-readable storage medium of claim 34, wherein the one of the plurality of endpoints capable of holding the audio or video bridging is determined based on hardware, software and networking capabilities of the one of the plurality of endpoints.

37. The non-transitory computer-readable storage medium of claim 34, further comprising:
   determining current load of the MVCT when a new endpoint is connecting to the MVCT by the AVBM; and
   transferring, the new endpoint to any endpoint capable of holding audio or video bridging by the AVBM when the current load of the MVCT exceeds a threshold value.

38. The non-transitory computer-readable storage medium of claim 34, wherein the endpoint comprises video communication terminals (VCTs) and voice over Internet protocol (IP) communication terminals (VoCTs), wherein the VCTs include terminals capable of video communication over IP and wherein the VoCTs include stand-alone or in-built terminals capable of audio communication over IP.

* * * * *